United States Patent
Chung et al.

(10) Patent No.: US 11,269,204 B2
(45) Date of Patent: *Mar. 8, 2022

(54) VIEWING ANGLE SWITCHABLE LIQUID CRYSTAL DISPLAY DEVICE AND VIEWING ANGLE SWITCHING METHOD

(71) Applicant: INFOVISION OPTOELECTRONICS (KUNSHAN) CO., LTD., Kunshan (CN)

(72) Inventors: Te-Chen Chung, Kunshan (CN); Chia-Te Liao, Kunshan (CN); Zifang Su, Kunshan (CN); Limei Jiang, Kunshan (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 507 days.

This patent is subject to a terminal disclaimer.

(21) Appl. No.: 16/324,555

(22) PCT Filed: Dec. 1, 2016

(86) PCT No.: PCT/CN2016/108242
§ 371 (c)(1),
(2) Date: Feb. 9, 2019

(87) PCT Pub. No.: WO2018/098782
PCT Pub. Date: Jun. 7, 2018

(65) Prior Publication Data
US 2021/0286206 A1    Sep. 16, 2021

(51) Int. Cl.
*G02F 1/13* (2006.01)
*G02F 1/137* (2006.01)
(Continued)

(52) U.S. Cl.
CPC ........ *G02F 1/1323* (2013.01); *G02F 1/13306* (2013.01); *G02F 1/13706* (2021.01);
(Continued)

(58) Field of Classification Search
None
See application file for complete search history.

(56) References Cited

U.S. PATENT DOCUMENTS 10,649,283 B2 * 5/2020 Chung ................ G02F 1/13306
2014/0063386 A1 * 3/2014 Yang ..................... G02F 1/1323
349/33

FOREIGN PATENT DOCUMENTS

CN    1892370 A    1/2007
CN    201251664 Y    6/2009
(Continued)

*Primary Examiner* — Ashok Patel
(74) *Attorney, Agent, or Firm* — Cheng-Ju Chiang

(57) ABSTRACT

A viewing angle switchable liquid crystal display device includes a display panel. The display panel includes a first substrate, a second substrate disposed opposite the first substrate, and a liquid crystal layer disposed between the first substrate and the second substrate. The second substrate is provided with a first electrode and a second electrode. The first electrode is a common electrode, and the second electrode is a pixel electrode. The first substrate is provided with a third electrode for controlling the switching of the viewing angle. A periodic alternating voltage is applied to the third electrode when the viewing angle of the liquid crystal display device is switched, and a period of the periodic alternating voltage is an even multiple of a refresh period of each frame of the display panel.

14 Claims, 17 Drawing Sheets

(51) Int. Cl.
  *G02F 1/133* (2006.01)
  *G02F 1/1335* (2006.01)
  *G09G 3/36* (2006.01)

(52) U.S. Cl.
  CPC .. *G02F 1/133512* (2013.01); *G02F 1/133514* (2013.01); *G09G 3/3648* (2013.01); *G09G 2320/0606* (2013.01); *G09G 2320/068* (2013.01); *G09G 2354/00* (2013.01)

(56) References Cited

FOREIGN PATENT DOCUMENTS

| | | |
|---|---|---|
| CN | 103091883 A | 5/2013 |
| CN | 103365002 A | 10/2013 |
| CN | 105425480 A | 3/2016 |
| CN | 205301766 U | 6/2016 |
| CN | 105807511 A | 7/2016 |
| JP | 2006-276327 A | 10/2006 |
| JP | 2007-148337 A | 6/2007 |
| JP | 2013-156454 A | 8/2013 |
| KR | 10-2011-0010429 A | 2/2011 |
| TW | 201411250 A | 3/2014 |
| WO | 2013/031171 A1 | 3/2013 |

\* cited by examiner

VIEWING ANGLE SWITCHABLE LIQUID CRYSTAL DISPLAY DEVICE AND VIEWING ANGLE SWITCHING METHOD

CROSS REFERENCE TO RELATED APPLICATIONS

This application is a 35 U.S.C. § 371 National Phase conversion of International (PCT) Patent Application No. PCT/CN2016/108242, filed on Dec. 1, 2016. The PCT International Patent Application was filed and published in Chinese.

TECHNICAL FIELD

The present application relates to the technical field of liquid crystal display, and more particularly to a liquid crystal display with a switchable viewing angle and a viewing angle switching method.

BACKGROUND

Liquid crystal display (LCD) has the advantages of good image quality, small size, light weight, low driving voltage, low power consumption, no radiation and relatively low manufacturing cost, and is dominant in the field of flat panel display.

Nowadays, liquid crystal display devices are gradually developing towards a wide viewing angle, and liquid crystal display devices such as an in-plane switching mode (IPS) or a fringe field switching mode (FFS) can realize wide viewing angle. The wide viewing angle allows the user to see a complete, undistorted image from all directions. However, people in today's society are paying more and more attention to protecting their privacy. There are many things that do not like to share with others. In public places, people want to keep their content confidential when they use a mobile phone or browse a computer. Therefore, the display device with a single viewing angle mode has been unable to meet the needs of the user. In addition to the need for a wide viewing angle, the display device is also desirable to be switched or adjusted to a narrow viewing angle when privacy protection is required.

Currently, there are two ways to switch the wide viewing angle and the narrow viewing angle of the liquid crystal display device. The first way is to attach a louver shielding film on the screen in order to reduce the viewing angle in the need for protecting privacy. The second way is to provide a dual light source backlight system in the liquid crystal display device for adjusting the viewing angle of the liquid crystal display device. The dual light source backlight system is composed of a two-layer laminated light guide plates combined with anti-prism sheets. The top light guide plate (LGP-T) combined with the anti-prism sheet is used to change the direction of the light, so that the light is restricted to a narrow range, thereby achieving a narrow viewing angle for the liquid crystal display device, while the bottom light guide plate (LGP-B) combined with the anti-prism sheet is used for realizing a wide viewing angle for the liquid crystal display device.

However, the above first method has the drawback that needs to prepare an additional louver shielding film, which causes great inconvenience to the user, and a louver shielding film can only achieve a single viewing angle. Once a louver shielding film is attached, the viewing angle is fixed, only a narrow viewing angle mode can be realized, and the viewing angle cannot be changed according to the user's needs. The above second method has the drawback that the dual light source backlight system causes the thickness and the cost of the liquid crystal display device to increase, which is not in line with the development trend of thin and light liquid crystal display devices.

SUMMARY

The object of the present application is to provide a liquid crystal display device with a viewing angle switchable and a viewing angle switching method, which can easily realize switching between a wide viewing angle and a narrow viewing angle without using a shielding film and substantially without increasing product thickness and manufacturing cost, and having good operational flexibility and convenience.

A viewing angle switchable liquid crystal display device provided by an embodiment of the present application includes a display panel. The display panel includes a first substrate, a second substrate disposed opposite the first substrate, and a liquid crystal layer disposed between the first substrate and the second substrate. The second substrate is provided with a first electrode and a second electrode. The first electrode is a common electrode, and the second electrode is a pixel electrode. The first substrate is provided with a third electrode for controlling the switching of the viewing angle. A periodic alternating voltage is applied to the third electrode when the viewing angle of the liquid crystal display device is switched, and a period of the periodic alternating voltage is an even multiple of a refresh period of each frame of the display panel.

Further, the liquid crystal molecules in the liquid crystal layer are positive liquid crystal molecules, when the periodic alternating voltage is applied to the third electrode, the liquid crystal display device switches from a wide viewing angle mode to a narrow viewing angle mode.

Further, in the wide viewing angle mode, a direct current common voltage is applied to the first electrode, a direct current voltage is applied to the third electrode, and the potential difference between the direct current voltage applied to the third electrode and the direct current common voltage applied to the first electrode is smaller than 1V.

Further, in the narrow viewing angle mode, a direct current common voltage is applied to the first electrode, a periodic alternating voltage is applied to the third electrode, the periodic alternating voltage applied to the third electrode fluctuates around the direct current common voltage applied to the first electrode, and the potential difference between the periodic alternating current applied to the third electrode and the direct current common voltage applied to the first electrode is greater than 1V.

Further, the liquid crystal molecules in the liquid crystal layer are negative liquid crystal molecules, when the periodic alternating voltage is applied to the third electrode, the liquid crystal display device switches from a narrow viewing angle mode to a wide viewing angle mode.

Further, in the narrow viewing angle mode, a direct current common voltage is applied to the first electrode, a direct current voltage is applied to the third electrode, and the potential difference between the direct current voltage applied to the third electrode and the direct current common voltage applied to the first electrode is smaller than 1V.

Further, in the wide viewing angle mode, a direct current common voltage is applied to the first electrode, a periodic alternating voltage is applied to the third electrode, the periodic alternating voltage applied to the third electrode fluctuates around the direct current common voltage applied to the first electrode, and the potential difference between the periodic alternating current applied to the third electrode and the direct current common voltage applied to the first electrode is greater than 1V.

Further, the period of the periodic alternating voltage is twice or four times the refresh period of each frame of the display panel.

Further, a fourth electrode is further provided on the first substrate, the fourth electrode comprises a plurality of metal conductive strips, and the metal conductive strips are electrically connected to the third electrode.

Further, a color filter layer and a black matrix are further provided on the first substrate, and the metal conductive strips are overlapped with the black matrix.

Further, a color filter layer is further provided on the first substrate, and the metal conductive strips are intersected with each other to form a mesh structure and serve as a black matrix.

A method for switching the viewing angle of the above liquid crystal display device provided by an embodiment of the present application, including:

detecting whether the user issues a viewing angle switching request for switching the viewing angle;

when receiving a viewing angle switching request, supplying a periodic alternating voltage to the third electrode, wherein a period of the periodic alternating voltage is an even multiple of a refresh period of each frame of the display panel.

Further, the liquid crystal display device is provided with a viewing angle control button for the user to issue the viewing angle switching request to the liquid crystal display device.

A viewing angle switchable liquid crystal display device provided by an embodiment of the present application includes:

a display panel comprising a first substrate, a second substrate disposed opposite the first substrate, and a liquid crystal layer disposed between the first substrate and the second substrate, the second substrate being provided with a first electrode and a second electrode, the first electrode being a common electrode, the second electrode being a pixel electrode, the first substrate being provided with a third electrode for controlling the switching of the viewing angle;

a detecting module being configured to detect whether the user issues a viewing angle switching request for switching the viewing angle;

a driving circuit being connected to the detecting module, when receiving a viewing angle switching request, the driving circuit supplies a periodic alternating voltage to the third electrode, and a period of the periodic alternating voltage is an even multiple of a refresh period of each frame of the display panel.

Further, the liquid crystal display device is provided with a viewing angle control button for the user to issue the viewing angle switching request to the liquid crystal display device, the detecting module is connected to the viewing angle control button.

In the viewing angle switchable liquid crystal display device and the viewing angle switching method provided by embodiments of the present application, by providing a third electrode for controlling the viewing angle on the first substrate, a periodic alternating voltage is applied to the third electrode when switching the viewing angle, such that a vertical electric field is formed between the first substrate and the second substrate for driving the liquid crystal molecules to deflect, to easily achieve switching between the wide and narrow viewing angles for the display panel.

Furthermore, the period of the periodic alternating voltage applied to the third electrode is an even multiple of the refresh period of each frame of the display panel, so that the positive and negative polarities are not switched in the middle of each frame during the display, thereby avoiding the problem of split-screen mura occurred due to the sudden change of voltage during the display of each frame, to improve the uniformity of the image display. The present application can easily realize switching between wide viewing angle and narrow viewing angle without using a shielding film, substantially without increasing product thickness and manufacturing cost, and having good operational flexibility and convenience, thereby providing a liquid crystal display device with the advantages of entertainment use and privacy protection.

DETAILED DESCRIPTION OF PREFERRED EMBODIMENTS

In order to make the objects, technical solutions and advantages of the present application much clear, embodiments of the present application will be further described with reference to the accompanying drawings.

First Embodiment

Figure 1:
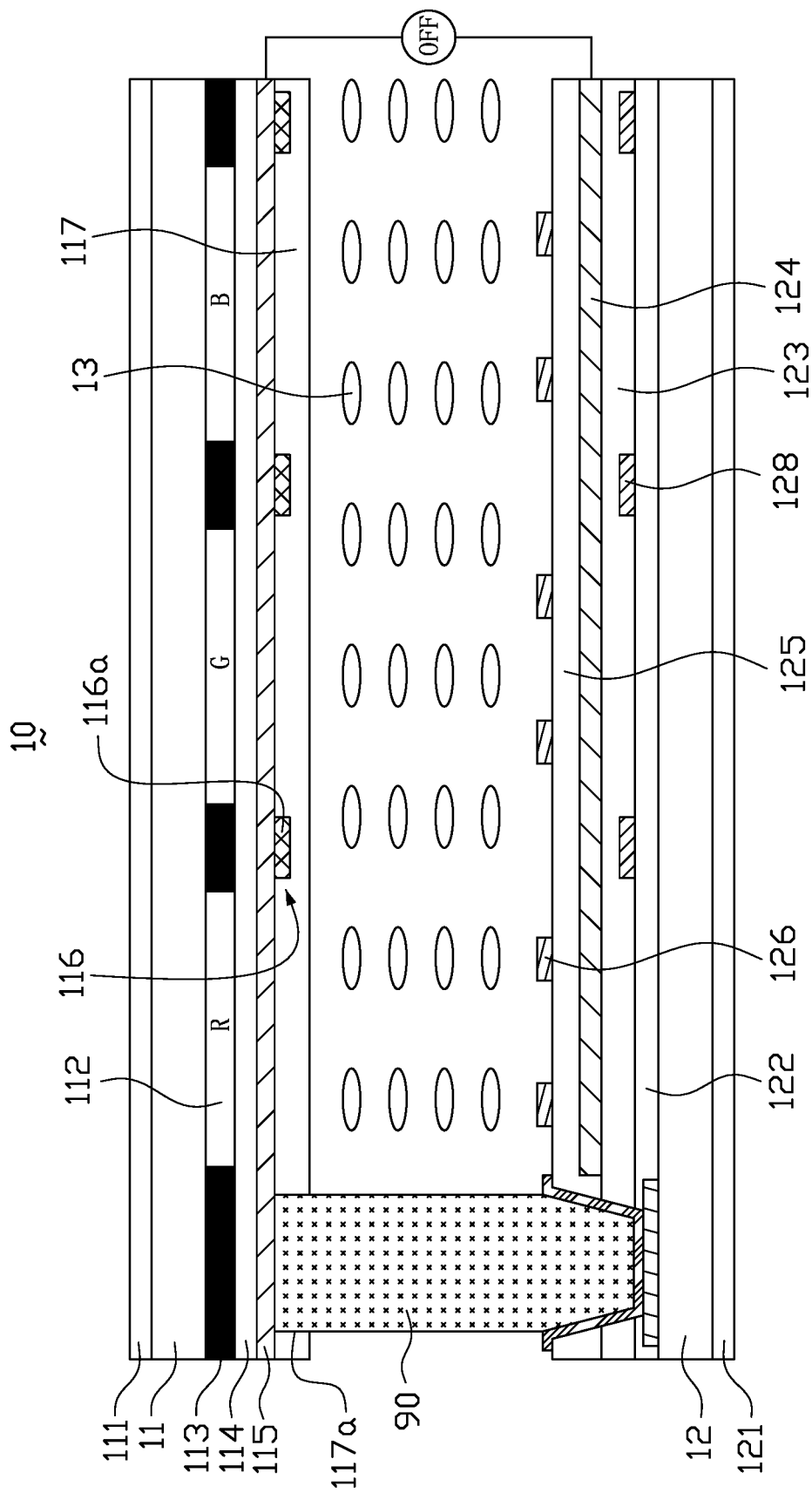
FIG. 1 is a schematic view of a liquid crystal display device in a wide viewing angle mode according to a first embodiment of the present application.
Figure 2:
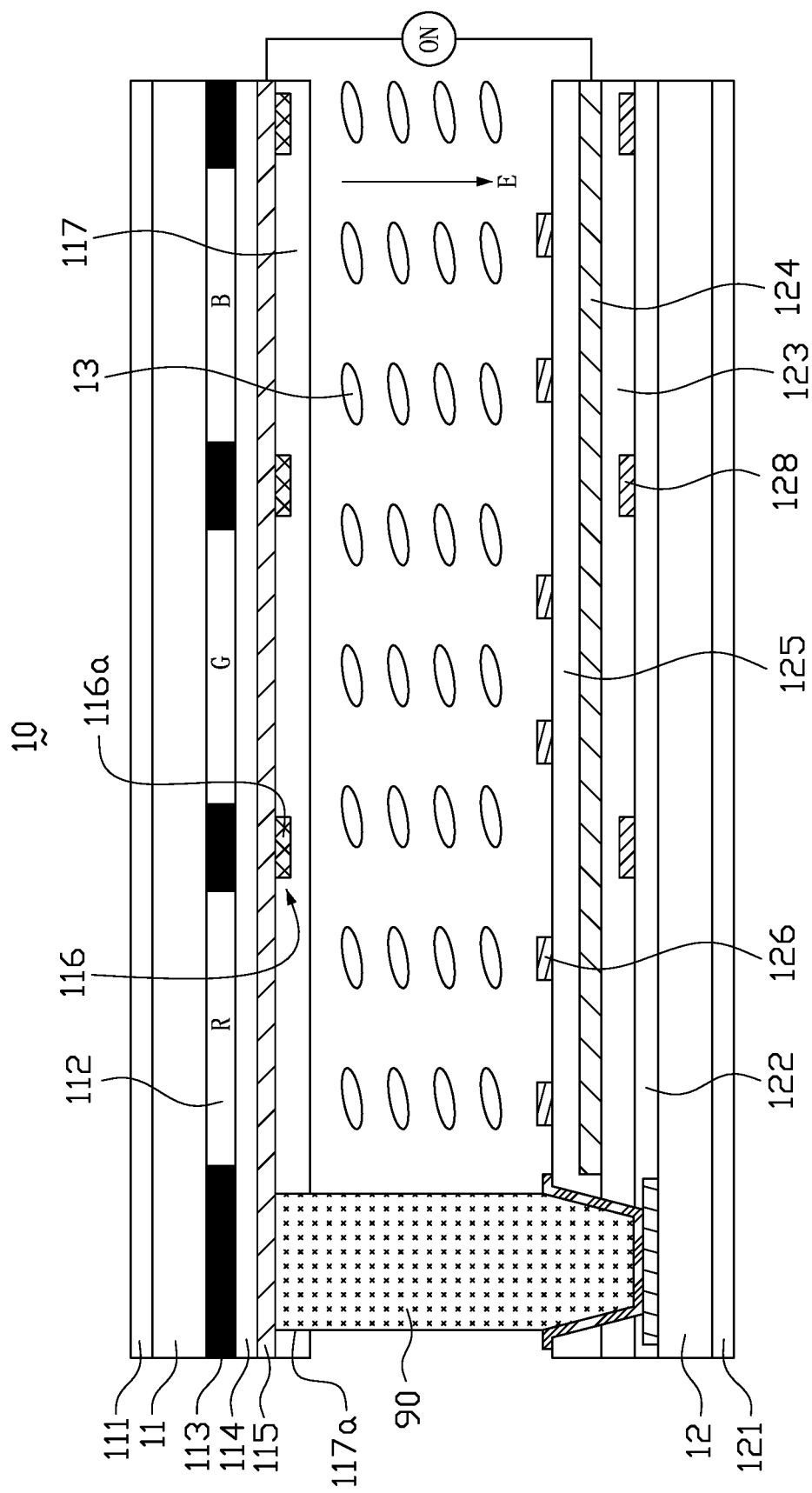
FIG. 2 is a schematic view of the liquid crystal display device of FIG. 1 in a narrow viewing angle mode.

FIG. 1 is a schematic view of a liquid crystal display device in a wide viewing angle mode according to a first embodiment of the present application, and FIG. 2 is a schematic view of the liquid crystal display device of FIG. 1 in a narrow viewing angle mode. Referring to FIG. 1 and FIG. 2, the liquid crystal display device includes a display panel 10. The display panel 10 includes a first substrate 11, a second substrate 12 disposed opposite to the first substrate 11, and a liquid crystal layer 13 disposed between the first substrate 11 and the second substrate 12.

In general, when a user views a screen of a liquid crystal display device from different viewing angles, the contrast of the image decreases as the viewing angle increases. In a conventional twisted nematic (TN) type liquid crystal display device, common electrode and pixel electrode are respectively formed on upper and lower substrates, and liquid crystal molecules are rotated in a plane perpendicular to the substrates. However, in the TN type liquid crystal display device, the liquid crystal molecules adjacent to the surfaces of the two substrates are arranged orthogonally to each other, and as a result, the viewing angle is narrow for the TN type liquid crystal display device. In order to achieve wide viewing angle, liquid crystal display devices of in-plane switching (IPS) using a horizontal electric field and fringe field switching (FFS) using a fringe electric field have been developed. For the IPS type or FFS type liquid crystal display device, the common electrode and the pixel electrode are formed on the same substrate (i.e., the TFT array substrate), and the liquid crystal molecules are rotated in a plane substantially parallel to the substrates to obtain a wider viewing angle.

The liquid crystal display device in this embodiment is applicable to in-plane switching (IPS) type or fringe field switching (FFS) type liquid crystal display device, and the common electrode and the pixel electrode are formed on the same substrate (i.e., TFT array substrate). When an electric field is applied between the common electrode and the pixel electrode for display, the liquid crystal molecules are rotated in a plane substantially parallel to the substrates to obtain a wide viewing angle. In this embodiment, the liquid crystal display device will be described by taking fringe field switching (FFS) type as an example.

In this embodiment, the first substrate 11 is a color filter substrate, and the second substrate 12 is a TFT array substrate. The first substrate 11 is provided with a first polarizer 111 on the surface facing away from the liquid crystal layer 13. The second substrate 12 is provided with a second polarizer 121 on the surface facing away from the liquid crystal layer 13. The light transmission axis of the first polarizer 111 is perpendicular to that of the second polarizer 121.

In this embodiment, the second substrate 12 is provided with a gate insulating layer 122, an insulating protective layer 123, a first electrode 124, an intermediate insulating layer 125 and a second electrode 126 on the surface facing towards the liquid crystal layer 13. The gate insulating layer 122 is formed on the surface of the second substrate 12 facing towards the liquid crystal layer 13. The insulating protective layer 123 is formed on the gate insulating layer 122. The first electrode 124 is formed on the insulating protective layer 123. The intermediate insulating layer 125 is formed on the first electrode 124. The second electrode 126 is formed on the intermediate insulating layer 125. However, the present application is not limited thereto, and the structures and arrangements between the respective layers can be adjusted as required.

In this embodiment, the first substrate 11 is provided with a color filter layer 112, a black matrix (BM) 113, a first overcoat layer 114, a third electrode 115, a fourth electrode 116 and a second overcoat layer 117 on the surface facing towards the liquid crystal layer 13. The color filter layer 112 and the black matrix 113 are formed on the surface of the first substrate 11 facing towards the liquid crystal layer 13. The first overcoat layer 114 covers the color filter layer 112 and the black matrix 113. The third electrode 115 is formed on the first overcoat layer 114. The fourth electrode 116 is formed on the third electrode 115 and overlapped with the black matrix 113. The fourth electrode 116 is electrically connected with the third electrode 115. The second overcoat layer 117 is formed on the third electrode 115 and covers the fourth electrode 116. However, the present application is not limited thereto, and the structures and arrangements between the respective layers can be appropriately adjusted as required.

The color filter layer 112 includes, for example, red (R), green (G), and blue (B) color resist materials, for respectively corresponding to red, green, and blue sub-pixels. The black matrix 113 is disposed between the red, the green, and the blue sub-pixels, so that adjacent sub-pixels are spaced apart from each other by the black matrix 113. The first overcoat layer 114 is used to planarize the surfaces of the color filter layer 112 and the black matrix 113, and the second overcoat layer 117 is used to planarize the surface of the fourth electrode 116.

The first electrode 124, the second electrode 126 and the third electrode 115 may be made of a transparent material such as indium tin oxide (ITO) or indium zinc oxide (IZO). The first electrode 124 is a common electrode for being applied with a common voltage (Vcom) for image display. The second electrode 126 is a pixel electrode formed in each sub-pixel SP (see FIG. 3). The third electrode 115 is a viewing angle control electrode for controlling the switching of viewing angle of the display panel 10.

In this embodiment, the second electrode 126 is disposed above the first electrode 124, with the intermediate insulating layer 125 disposed therebetween, but it is not limited thereto. In other embodiments, the second electrode 126 and the first electrode 124 may be interchanged for their locations. In addition, when the liquid crystal display device adopts in-plane switching (IPS) type, the first electrode 124 and the second electrode 126 may be disposed in the same layer and insulated from each other.

Figure 3:
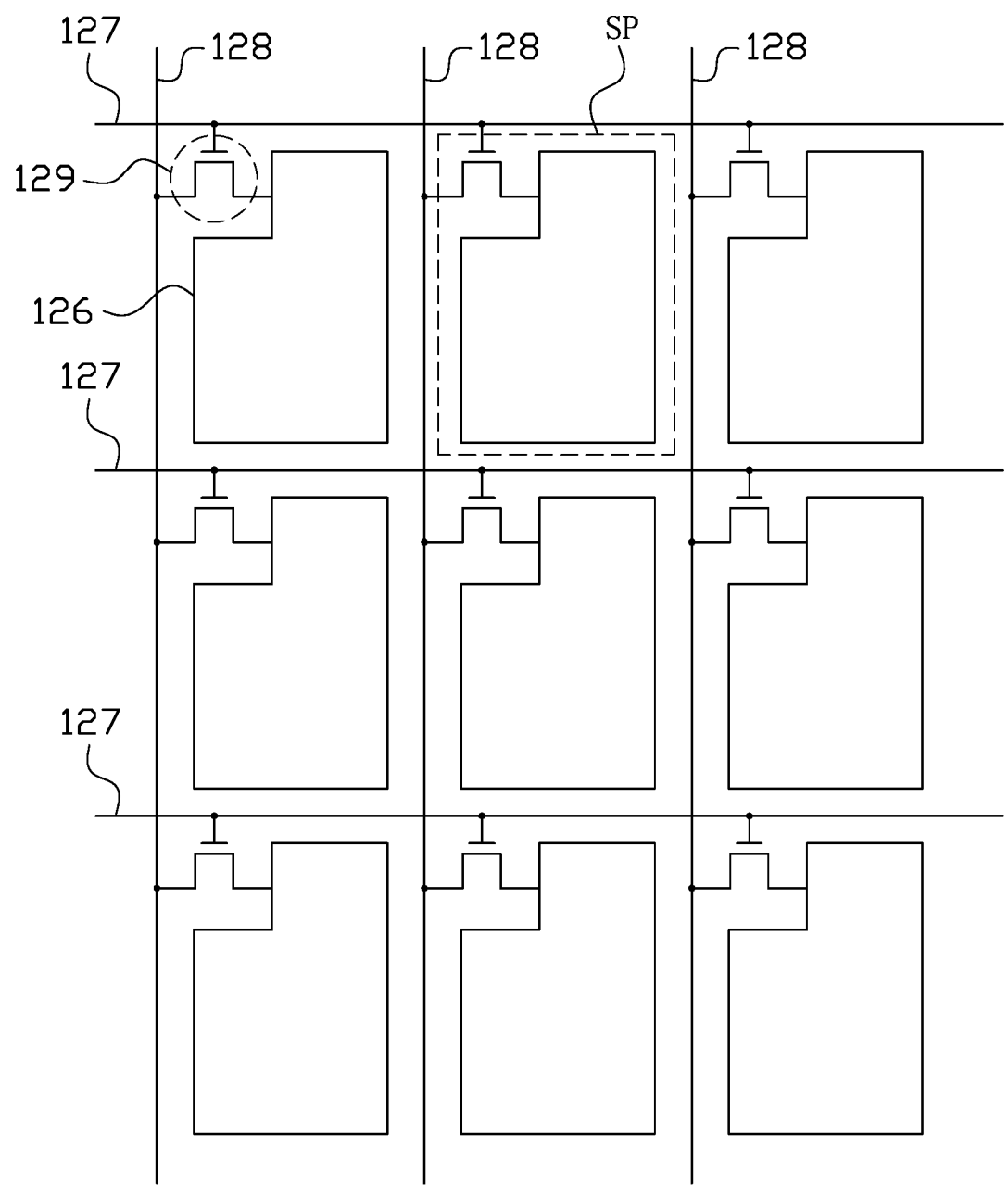
FIG. 3 is a circuit diagram of the second substrate of the liquid crystal display device of FIG. 1.

FIG. 3 is a circuit diagram of the second substrate of the liquid crystal display device of FIG. 1. Referring to FIG. 3, the second substrate 12 is further provided with scanning lines 127 and data lines 128, wherein a plurality of scanning lines 127 and a plurality of data lines 128 are intersected with each other to define a plurality of sub-pixels SP. A pixel electrode (i.e., the second electrode 126) and a thin film transistor (TFT) 129 are disposed in each sub-pixel SP, and the thin film transistor 129 is located near a position where the scanning line 127 and the data line 128 are intersected. The thin film transistor 129 includes a gate electrode, an active layer, a source electrode and a drain electrode (not shown), wherein the gate electrode is electrically connected to a corresponding scanning line 127, the source electrode is electrically connected to a corresponding data line 128, and the drain electrode is electrically connected to a corresponding pixel electrode (i.e., the second electrode 126).

Referring to FIG. 1 and FIG. 3, the gate insulating layer 122 is formed on the surface of the second substrate 12 facing towards the liquid crystal layer 13 and covers the scanning lines 127 and the gate electrodes of the thin film transistors 129. The insulating protective layer 123 is located on the gate insulating layer 122 and covers the data lines 128 and the source electrodes and the drain electrodes of the thin film transistors 129. The intermediate insulating layer 125 is disposed between the first electrode 124 (i.e., the common electrode) and the second electrode 126 (i.e., the pixel electrode) for the purpose of insulating.

In this embodiment, the liquid crystal molecules in the liquid crystal layer 13 are positive liquid crystal molecules, and the positive liquid crystal molecules have the advantage of fast response. Referring to FIG. 1, in the initial state (i.e., no voltage is applied to the display panel 10), the positive liquid crystal molecules in the liquid crystal layer 13 assume a lying posture in parallel to the substrates 11, 12, with the long-axis direction of the positive liquid crystal molecules being substantially parallel to the substrates 11, 12. In practical applications, the positive liquid crystal molecules in the liquid crystal layer 13 may have a small initial pretilt angle relative to the substrates 11, 12, and the initial pretilt angle may be in the range of less than or equal to 10 degrees, namely, $0° \leq \theta \leq 10°$.

The third electrode 115 is used for controlling the switching of viewing angle of the display panel 10. By applying different voltages to the third electrode 115, the display panel 10 may switch between a wide viewing angle mode and a narrow viewing angle mode.

Referring to FIG. 1, a direct current common voltage (i.e., DC Vcom) is applied to the first electrode 124, and a direct current voltage is also applied to the third electrode 115, such that the potential difference between the direct current voltage applied to the third electrode 115 and the direct current common voltage applied to the first electrode 124 is small (e.g., smaller than 1V). Since a bias voltage between the third electrode 115 and the first electrode 124 is small, the tilt angle of the liquid crystal molecules is almost unchanged and remains in the lying posture. The liquid crystal molecules are driven by an in-plane electric field formed between the pixel electrode (i.e., the second electrode 126) and the common electrode (i.e., the first electrode 124) provided on the same substrate (i.e., the second substrate 12) to rotate in a plane parallel to the substrates 11, 12. The liquid crystal molecules achieve a wide viewing angle mode under the action of a strong in-plane electric field.

Referring to FIG. 2, a direct current common voltage (i.e., DC Vcom) is applied to the first electrode 124, and a periodic alternating voltage is applied to the third electrode 115. The periodic alternating voltage applied to the third electrode 115 fluctuates around the direct current common voltage applied to the first electrode 124, so that the potential difference between the periodic alternating voltage applied to the third electrode 115 and the direct current common voltage applied to the first electrode 124 is large (e.g., greater than 1V). Since a large bias voltage exists between the third electrode 115 of the first substrate 11 and the first electrode 124 of the second substrate 12, a strong vertical electric field is generated between the two substrates 11, 12 (as indicated by the arrow E in FIG. 2). Since the positive liquid crystal molecules will deflect towards a direction parallel to the electric field lines under an electric field, the positive liquid crystal molecules are deflected under the action of the vertical electric field, to increase the tilt angle between the liquid crystal molecules and the substrates 11, 12. The liquid crystal molecules are changed from the lying posture to a tilting posture, so that the light passing through the liquid crystal molecules in the squint direction of the display panel 10 is not matched with the upper and lower polarizers 111, 121 due to phase delay, and a light leakage occurs. When the display panel 10 is viewed from the squint direction, the contrast of the screen is lowered to affect the viewing effect, and the viewing angle is reduced, thereby achieving a narrow viewing angle mode. That is, in this embodiment, when the periodic alternating voltage described above is applied to the third electrode 115 of the first substrate 11, the liquid crystal display device switches from a wide viewing angle mode to a narrow viewing angle mode.

Figure 4A:
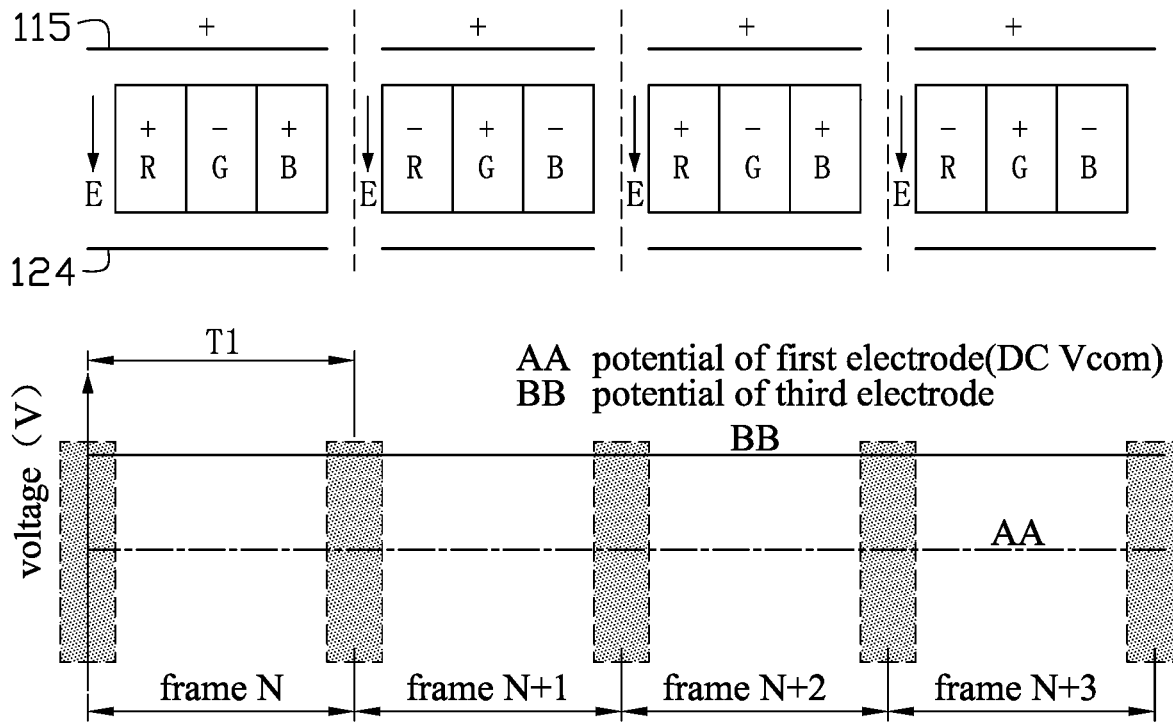
FIG. 4a to FIG. 4b are schematic diagrams showing waveforms of the alternating voltage applied to the third electrode in a comparative example.

However, as shown in FIG. 4a, when switching to the narrow viewing angle mode, if the voltage applied to the third electrode 115 of the first substrate 11 is a direct current voltage having a large amplitude instead of the above-described periodic alternating voltage, the potential difference between the third electrode 115 of the first substrate 11 and the first electrode 124 of the second substrate 12 is always in the same direction, and the direction of the vertical electric field E generated between the first substrate 11 and the second substrate 12 for driving the liquid crystal molecules is not varied. It is easy to generate direct current residual and cause image sticking problem, and the image display quality is poor. Therefore, in this embodiment, when switching to the narrow viewing angle mode, the voltage applied to the third electrode 115 needs to be a periodic alternating voltage, rather than a direct current voltage having a large amplitude, so that the direction of the vertical electric field E changes constantly. Thus, the image sticking problem caused by direct current residual is avoided while realizing the switching of viewing angle, and the image display quality is improved.

Figure 4B:
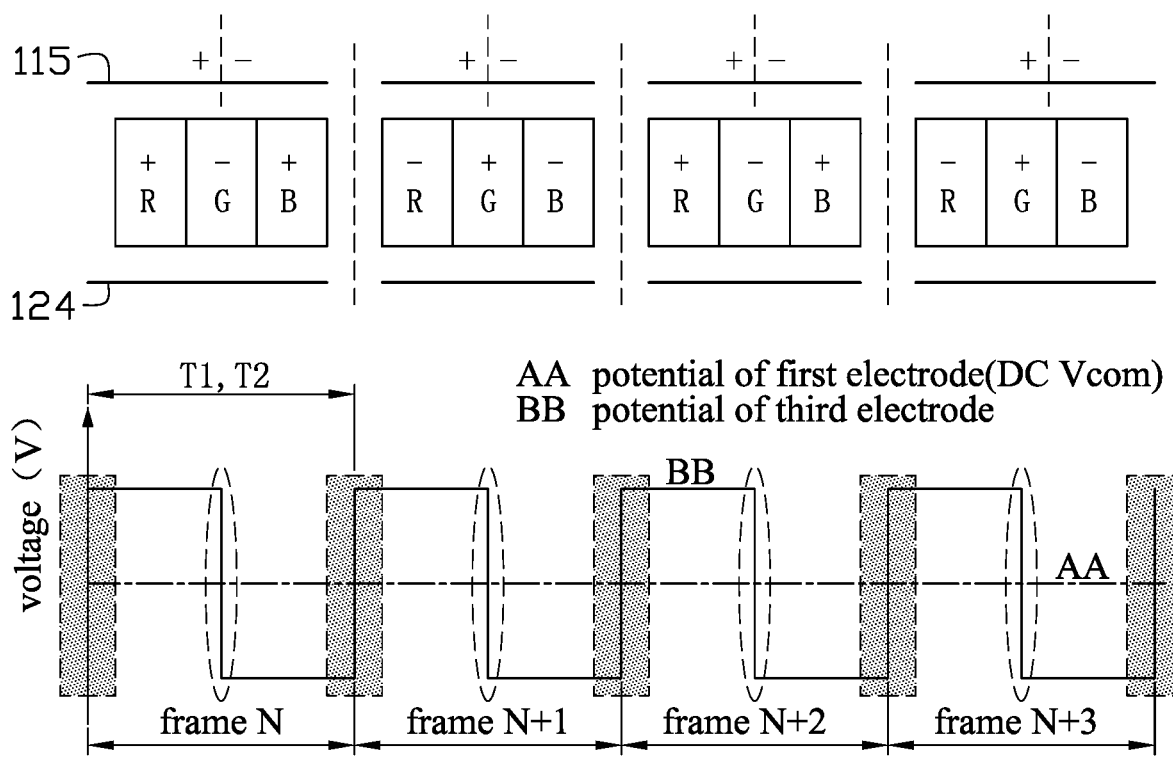

As shown in FIG. 4b, when switching to the narrow viewing angle mode, if the period T2 of the periodic alternating voltage applied to the third electrode 115 is equal to the refresh period T1 of each frame of the display panel 10 (i.e., T2=T1), the direction of the vertical electric field E generated between the first substrate 11 and the second substrate 12 for driving the liquid crystal molecules changes depending on the polarity of the alternating voltage applied to the third electrode 115. However, during the display of each frame, the alternating voltage on the third electrode 115 changes suddenly when the polarity is switched (as shown by the elliptical dotted line in FIG. 4b). Since the switching between the positive and negative polarities occurs in the middle of each frame, the potential difference changes remarkably when the positive and negative polarities are switched, and it is likely to occur the split-screen mura.

Figure 5A:
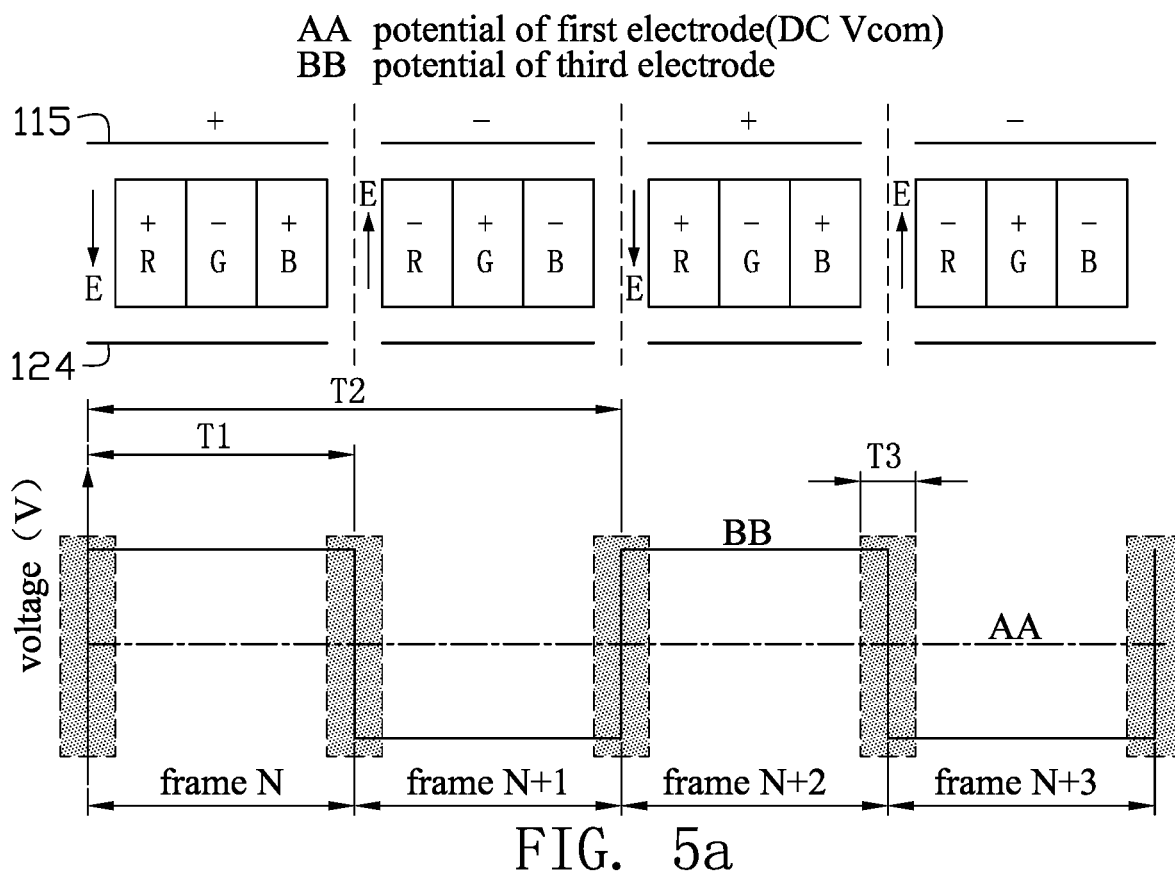
FIG. 5a to FIG. 5b are schematic diagrams showing waveforms of the alternating voltage applied to the third electrode in the present application.
Figure 5B:
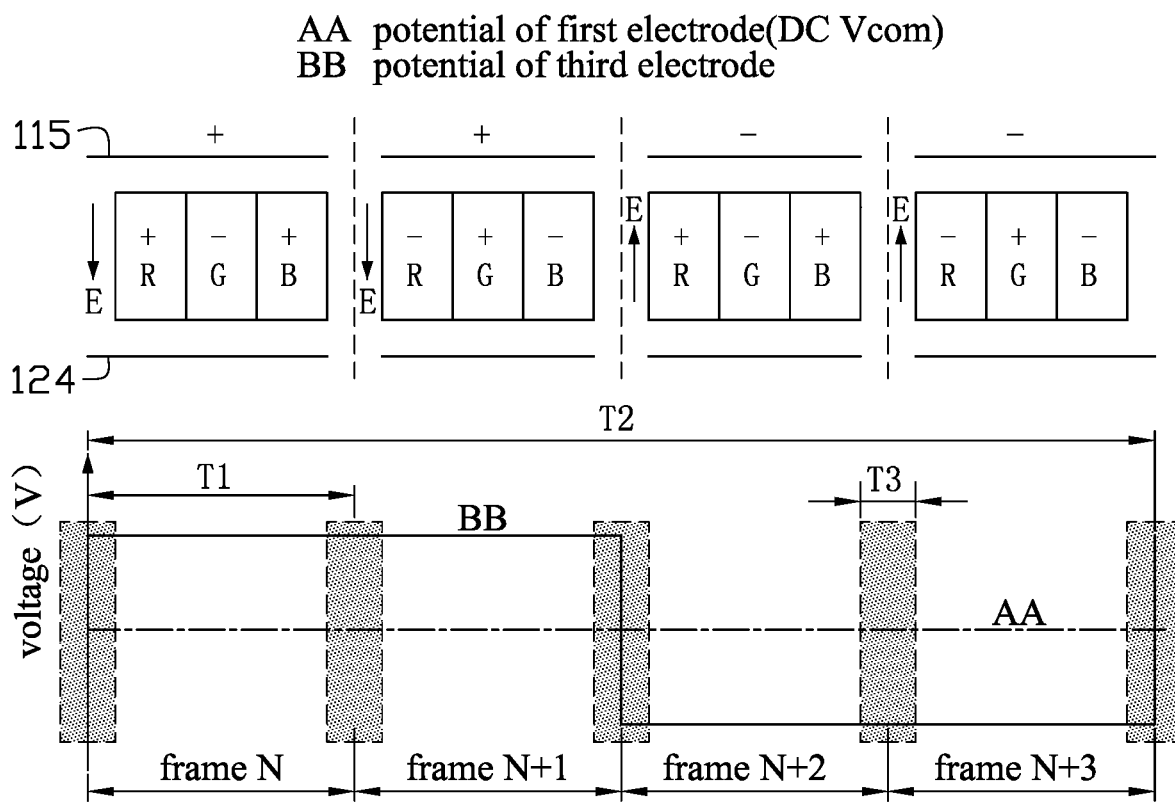
Figure 6A:
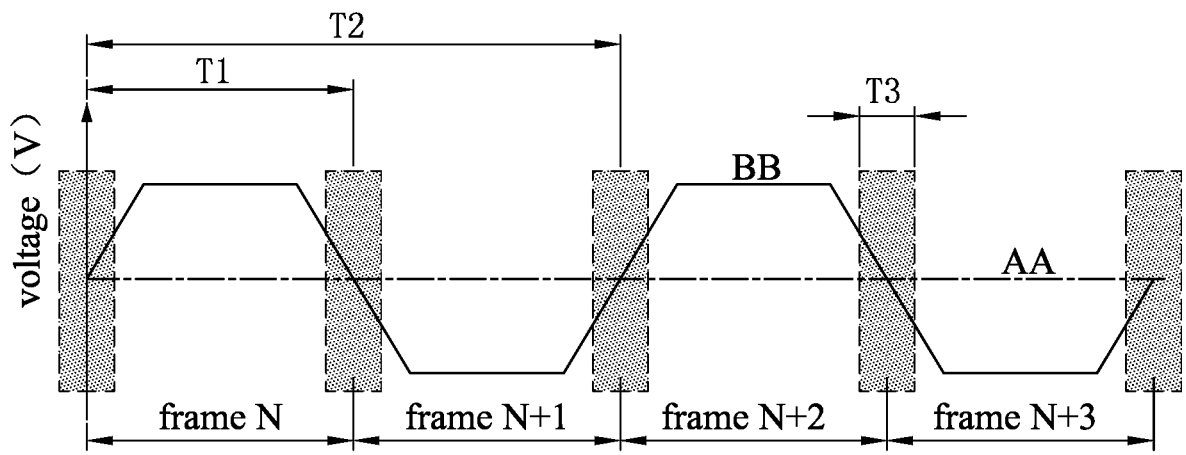
FIG. 6a to FIG. 6d are schematic diagrams showing other waveforms of the alternating voltage applied to the third electrode in the present application.
Figure 6B:
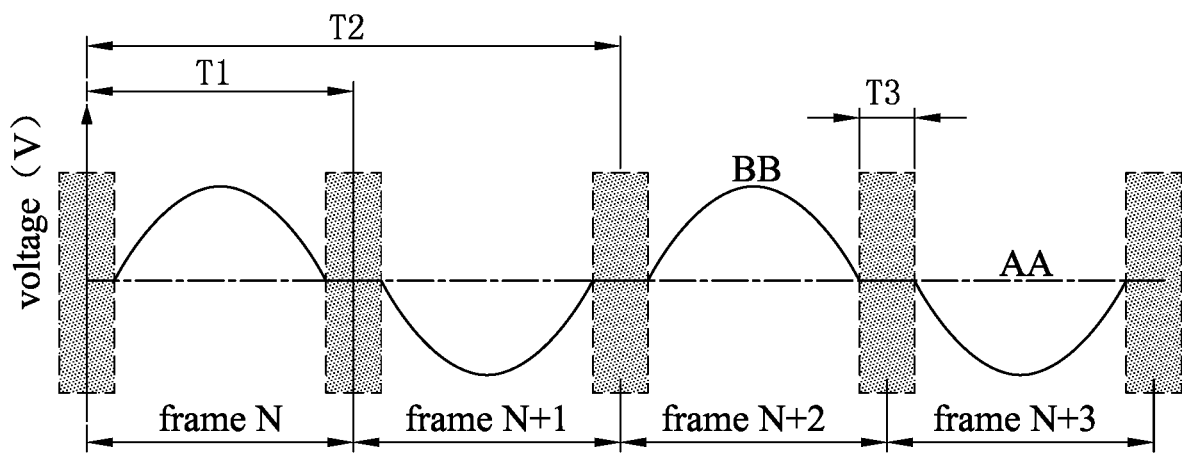
Figure 6C:
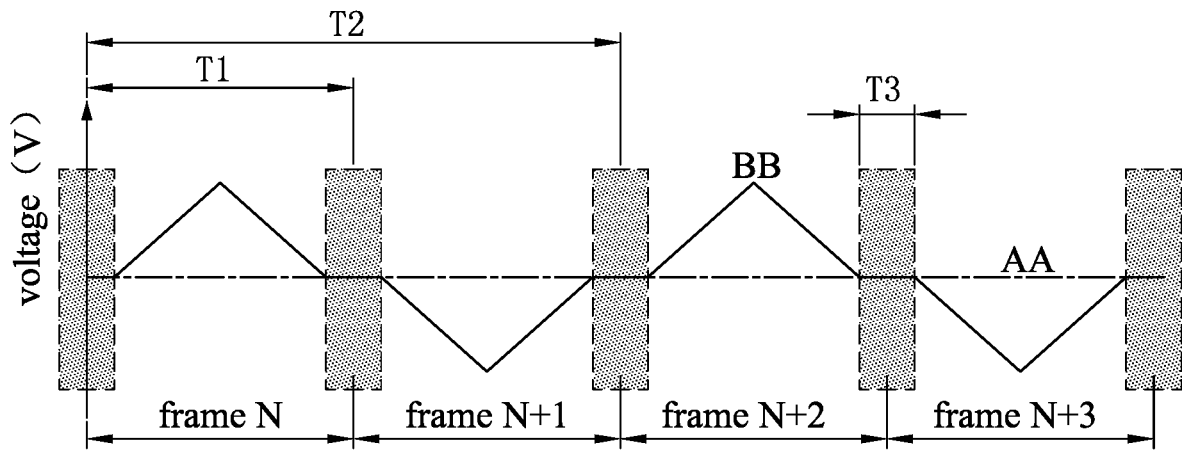
Figure 6D:
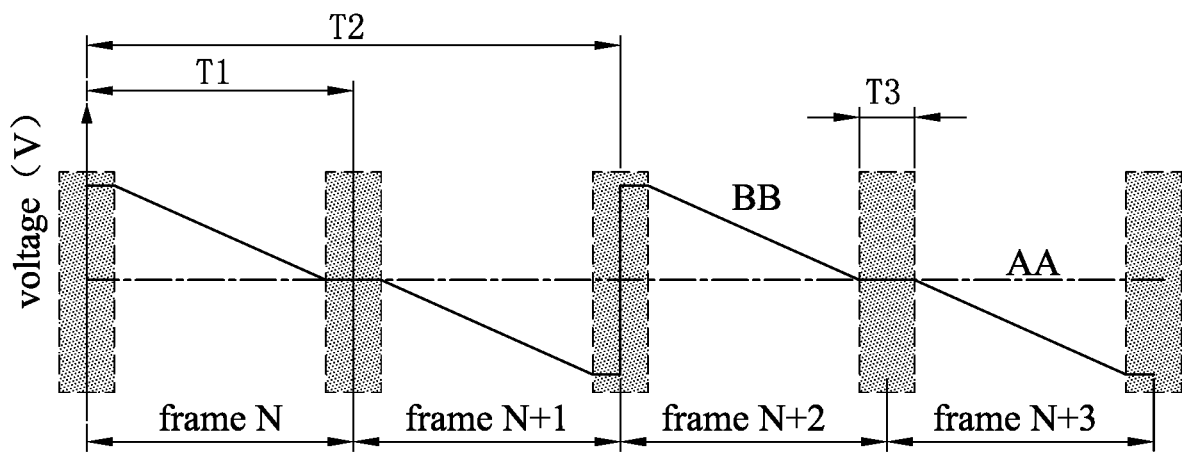

In this embodiment, as shown in FIG. 5a and FIG. 5b, when switching to the narrow viewing angle mode, the period T2 of the periodic alternating voltage applied to the third electrode 115 is an even multiple of the refresh period T1 of each frame of the display panel 10 (i.e., T2=2*n*T1, where n is a positive integer, preferably n=1 or 2).

In other words, in this embodiment, f1=2*n*f2, where f2 is the frequency of the periodic alternating voltage applied to the third electrode 115, and f1 is the refresh frequency (i.e., frame rate) of the display panel 10. Further, it has the following relationship: T1=1/(f1), T2=1/(f2), the unit is second. For example, when the refresh frequency (i.e., frame rate) of the display panel 10 is 60 Hz, then the refresh period T1 of each frame is 1/60 seconds.

As shown in FIG. 5a, when switching to the narrow viewing angle mode, the period T2 of the periodic alternating voltage applied to the third electrode 115 may be twice the refresh period T1 of each frame of the display panel 10 (i.e., T2=2*T1).

As shown in FIG. 5b, when switching to the narrow viewing angle mode, the period T2 of the periodic alternating voltage applied to the third electrode 115 may be four times the refresh period T1 of each frame of the display panel 10 (i.e., T2=4*T1).

As shown in FIGS. 5a and 5b, when switching to the narrow viewing angle mode, the waveform of the periodic alternating voltage applied to the third electrode 115 may be a square wave, but is not limited thereto. As shown in FIG. 6*a* to FIG. 6*d*, the waveform of the periodic alternating voltage applied to the third electrode 115 may also be a trapezoidal square wave (see FIG. 6*a*), a sine wave (see FIG. 6*b*), a triangular wave (see FIG. 6*c*), a saw-tooth (see FIG. 6*d*) or other waveforms.

In this embodiment, when switching to the narrow viewing angle mode, the voltage applied to the third electrode 115 is a periodic alternating voltage, and the period T2 of the periodic alternating voltage applied to the third electrode 115 is an even multiple of the refresh period T1 of each frame of the display panel 10, for example, two or four times, as shown in FIG. 5*a* and FIG. 5*b*, so that the alternating voltage applied to the third electrode 115 can avoid switching between positive and negative polarities in the middle of each frame during the display, thereby avoiding the problem of split-screen mura which may occur due to the sudden change of voltage during the display of each frame. In this embodiment, a blanking time T3 is arranged between two adjacent frames, and the blank time period T3 is a transition time period of two adjacent frames. The alternating voltage applied to the third electrode 115 can switch between positive and negative polarities during the blank period T3, so that the above-mentioned split-screen mura is avoided, and the uniformity of image display is improved. The voltage and the waveform applied to the third electrode 115 during the blank period T3 are not limited.

As shown in FIG. 1, in order to apply a voltage to the third electrode 115 of the first substrate 11, the third electrode 115 can be electrically conducted from the first substrate 11 to the second substrate 12 through a conductive paste 90 in the peripheral non-display region of the display panel 10. The voltage is supplied from a driving circuit 20 firstly to the second substrate 12, and then is applied from the second substrate 12 to the third electrode 115 of the first substrate 11 through the conductive paste 90. Further, the second overcoat layer 117 is defined with a through hole 117*a* in the peripheral non-display region to expose the third electrode 115, for facilitating the electrical connection of the conductive paste 90 to the third electrode 115 through the through hole 117*a*.

The third electrode 115 provided on the first substrate 11 for controlling the switching of the viewing angle is made of a transparent conductive material such as ITO or IZO. The resistance of ITO and IZO is generally large, so that the resistance load of the third electrode 115 is large, and the signal delay during transmission is large, and the voltage waveform may be distorted during transmission. The display quality may be abnormal due to waveform distortion or signal attenuation. In this embodiment, the fourth electrode 116 is further provided on the first substrate 11 and electrically connected to the third electrode 115. The fourth electrode 116 is made of a metal having a low resistivity such as Mo, Al, Au, Ag, or Cu. The fourth electrode 116 includes a plurality of strip-shaped metal conductive strips 116*a* extending along the direction in which the respective scanning lines 127 and/or the respective data lines 128 extend, and the metal conductive strips 116*a* are overlapped with the black matrix 113. That is, the metal conductive strips 116*a* are located directly below the black matrix 113 and are covered by the black matrix 113. The line width of the metal conductive strip 116*a* is preferably smaller than the line width of the black matrix 113, so that the metal conductive strips 116*a* are completely covered by the black matrix 113. Although the metal conductive strips 116*a* are made of metal and are opaque, since they are disposed directly under the black matrix 113 and covered by the black matrix 113, the aperture ratio and the transmittance of each sub-pixel SP are not affected by these metal conductive strips 116*a*.

Figure 7A:
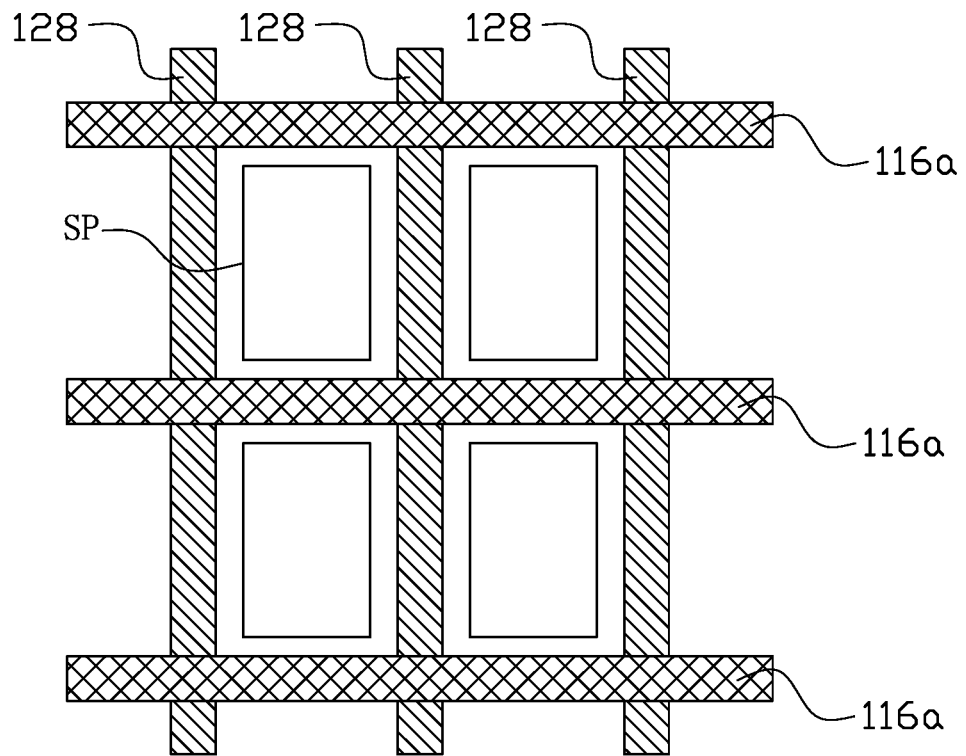
FIG. 7a to FIG. 7c are schematic views showing the pattern structure of the fourth electrode in different examples of the present application.

Referring to FIG. 7*a*, the metal conductive strips 116*a* extend along the direction in which the respective scanning lines 127 extend. Preferably, the metal conductive strips 116*a* have the same number as the scanning lines 127, that is, each metal conductive strip 116*a* is aligned with a scanning line 127, and adjacent two metal conductive strips 116*a* are spaced apart by the width of one row of sub-pixels.

Figure 7B:
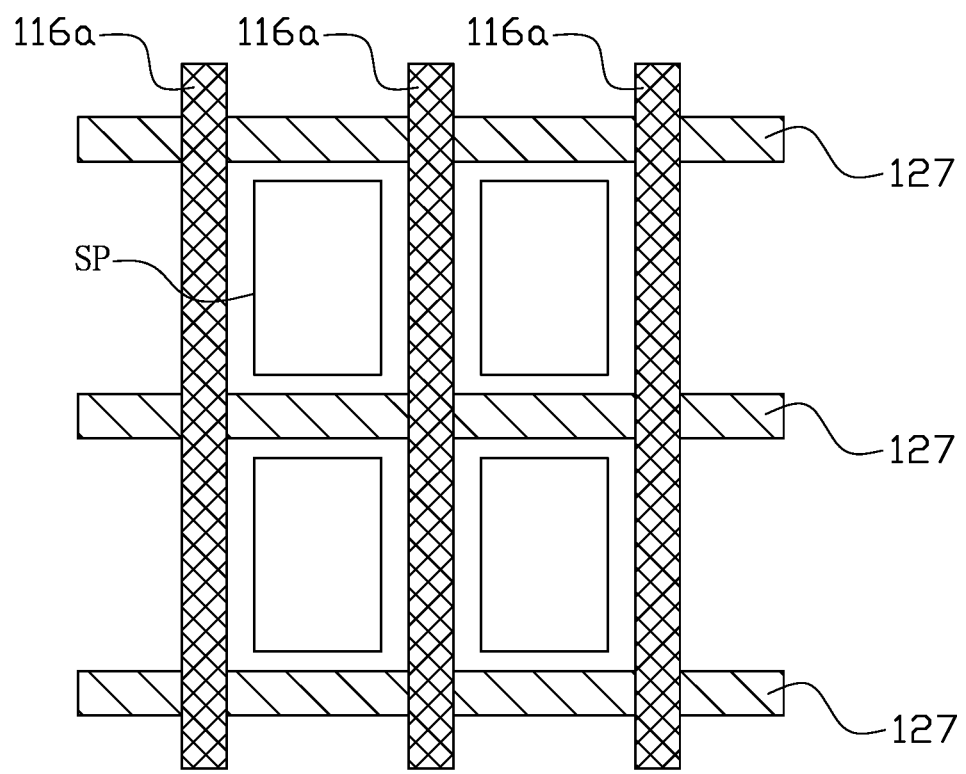

Alternatively, referring to FIG. 7*b*, the metal conductive strips 116*a* extend along the direction in which the respective data lines 128 extend. Preferably, the metal conductive strips 116*a* have the same number as the data lines 128, that is, each metal conductive strip 116*a* is aligned with a data line 128, and adjacent two metal conductive strips 116*a* are spaced apart by the width of one column of sub-pixels.

Figure 7C:
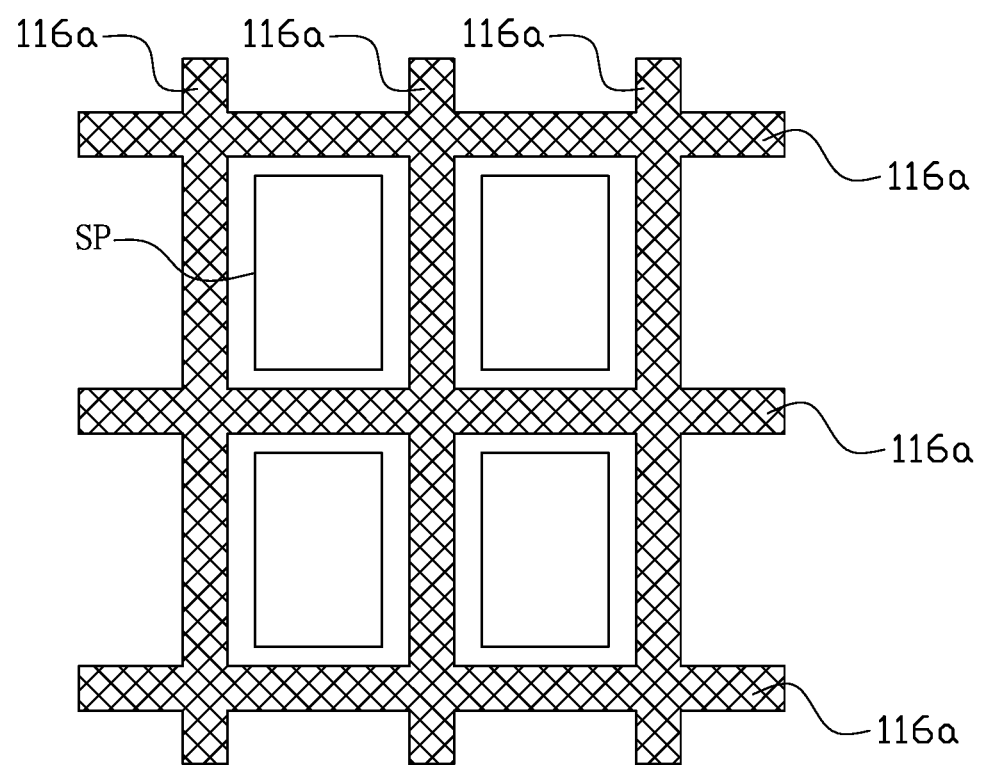

Alternatively, referring to FIG. 7*c*, the metal conductive strips 116*a* extend along the direction in which the respective data lines 128 and the respective scanning lines 127 extend, that is, the metal conductive strips 116*a* are intersected with each other to form a mesh structure. Preferably, the metal conductive strips 116*a* extending along the direction of the data lines 128 have the same number as the data lines 128, such that each data line 128 corresponds to one metal conductive strip 116*a*. The metal conductive strips 116*a* extending along the direction of the scanning lines 127 have the same number as the scanning lines 127, such that each scanning line 127 corresponds to one metal conductive strip 116*a*. Moreover, the mesh structure formed by the intersection of these metal conductive strips 116*a* has the same pattern as the black matrix 113.

The specific position of the metal conductive strips 116*a* on the first substrate 11 may be not limited, and may be adjusted as needed. As shown in FIG. 1, these metal conductive strips 116*a* are formed on the lower surface of the third electrode 115 and are directly and electrically connected to the third electrode 115.

Figure 8:
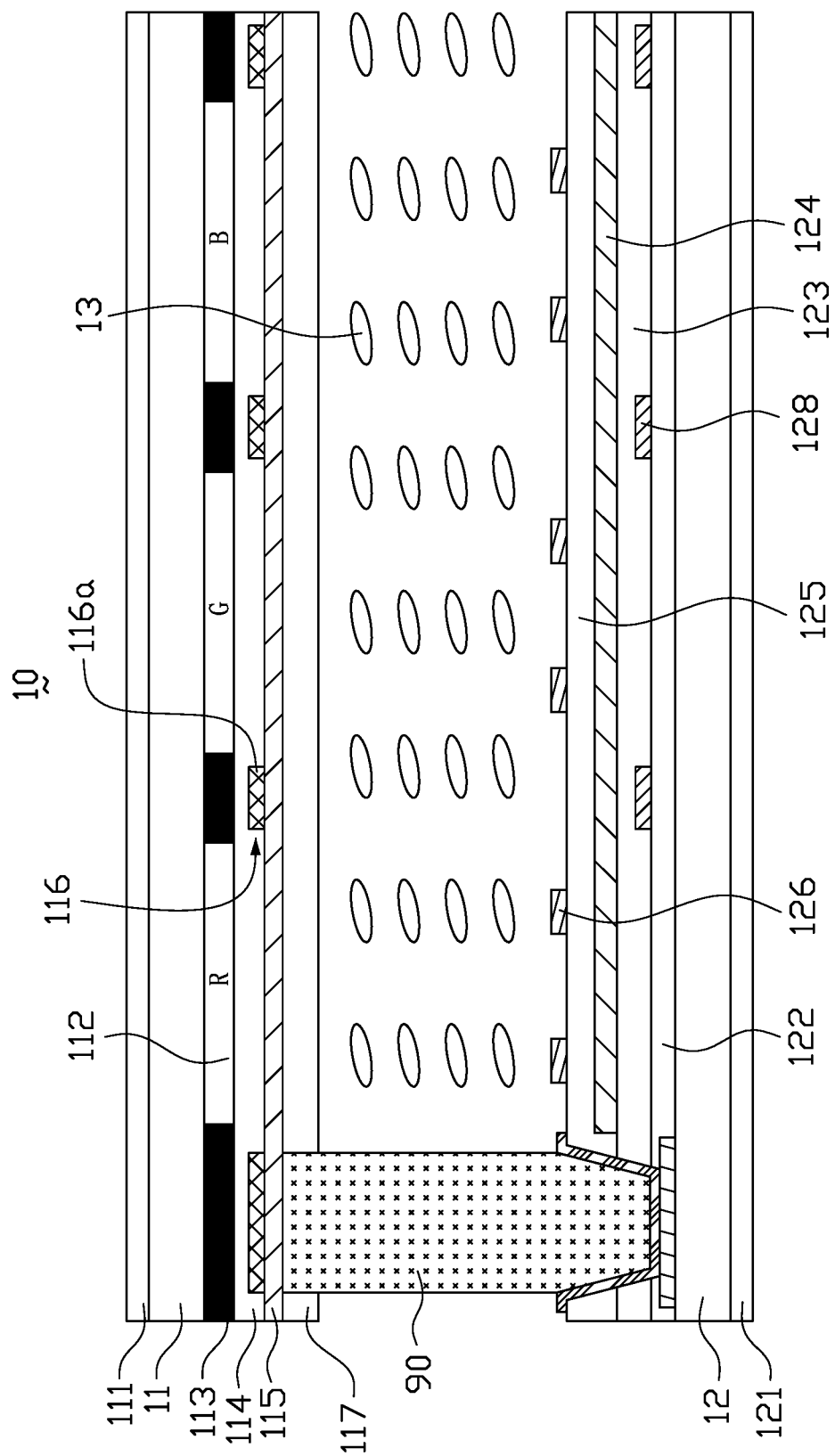
FIG. 8 to FIG. 11 are schematic views showing the fourth electrode in different positions on the first substrate in the present application.

Alternatively, as shown in FIG. 8, the first substrate 11 is provided with a color filter layer 112, a black matrix (BM) 113, a first overcoat layer 114, a fourth electrode 116, a third electrode 115 and a second overcoat layer 117 on the surface facing towards the liquid crystal layer 13. FIG. 8 differs from FIG. 1 in that the strip-shaped metal conductive strips 116*a* of the fourth electrode 116 are formed on the upper surface of the third electrode 115 and are directly and electrically connected to the third electrode 115.

Figure 9:
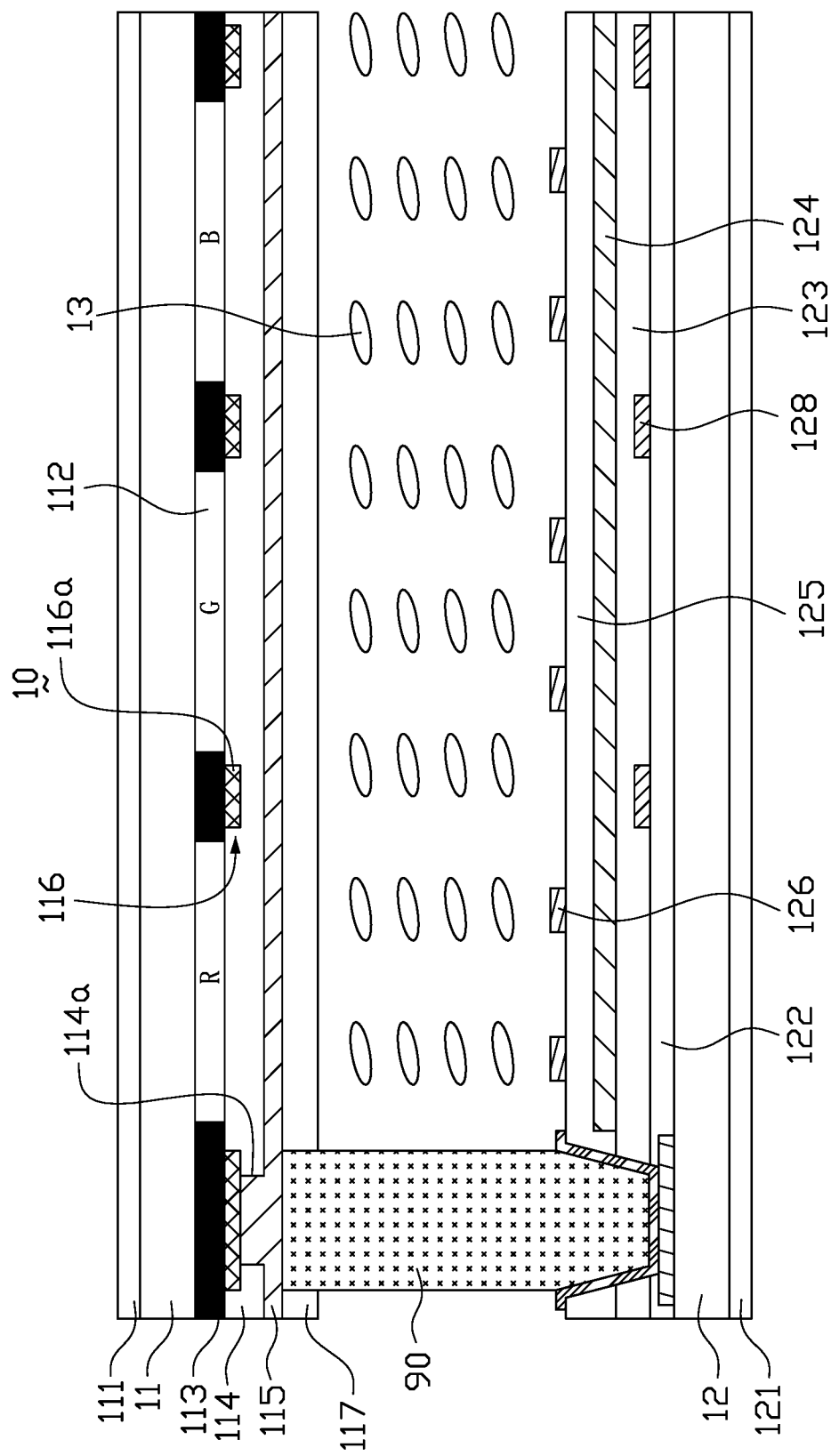

Alternatively, as shown in FIG. 9, the first substrate 11 is provided with a color filter layer 112, a black matrix (BM) 113, a fourth electrode 116, a first overcoat layer 114, a third electrode 115 and a second overcoat layer 117 on the surface facing towards the liquid crystal layer 13. FIG. 9 differs from FIG. 1 in that the strip-shaped metal conductive strips 116*a* of the fourth electrode 116 are formed on the lower surface of the black matrix 113. The first overcoat layer 114 covers the color filter layer 112 and the metal conductive strip 116*a*. The fourth electrode 116 and the third electrode 115 are spaced apart by the first overcoat layer 114, but the first overcoat layer 114 is provided with a through hole 114*a*, and the third electrode 115 is filled in the through hole 114*a* to cause the metal conductive strips 116*a* of the fourth electrode 116 to be electrically connected to the third electrode 115.

Figure 10:
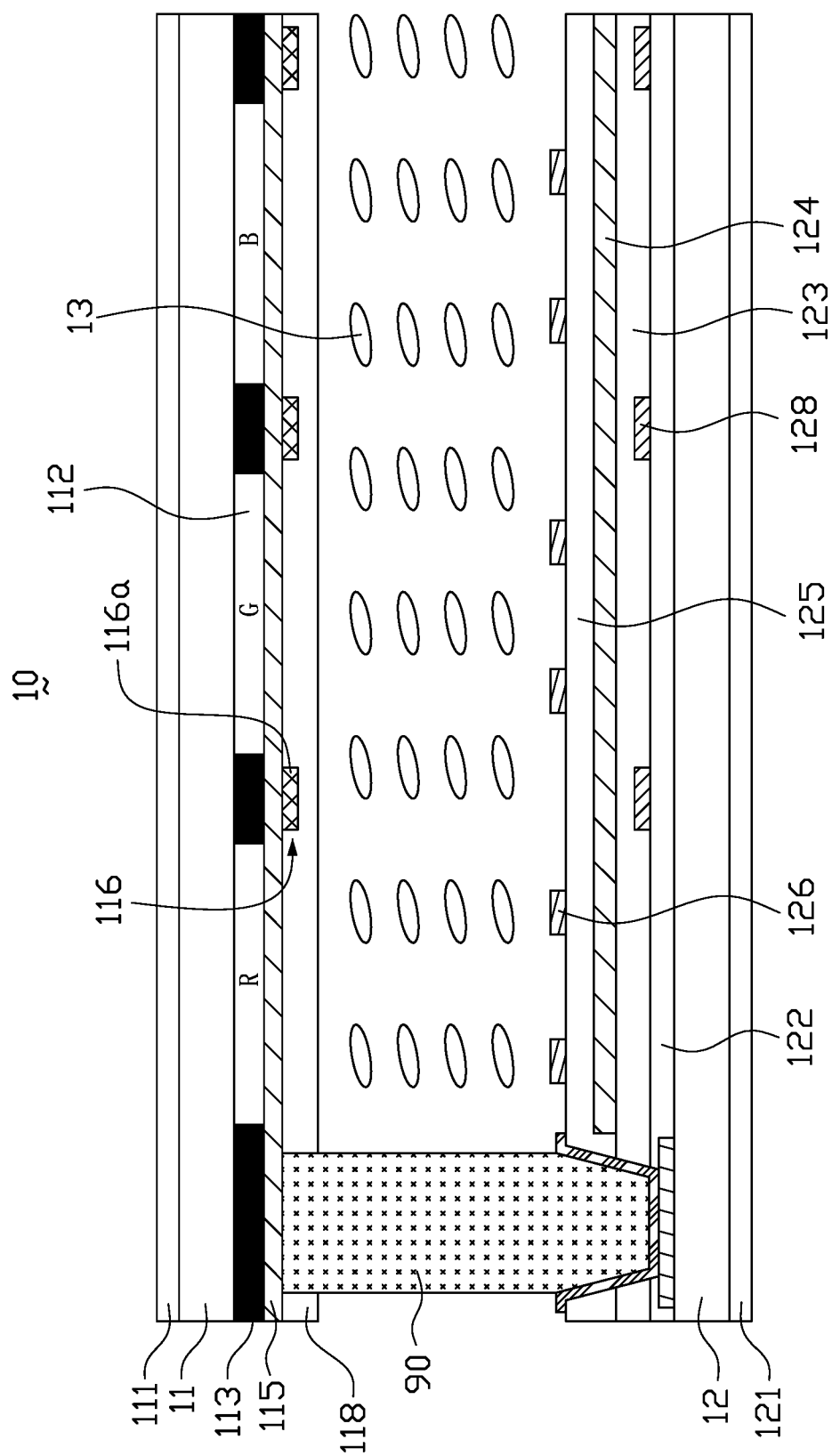

Alternatively, as shown in FIG. 10, the first substrate 11 is provided with a color filter layer 112, a black matrix (BM) 113, a third electrode 115, a fourth electrode 116 and an overcoat layer 118 on the surface facing towards the liquid crystal layer 13. FIG. 10 differs from FIG. 1 in that the overcoat layer between the color filter layer 112 and the third electrode 115 is omitted, and the color filter layer 112 and the black matrix 113 are covered by the third electrode 115.

Figure 11:
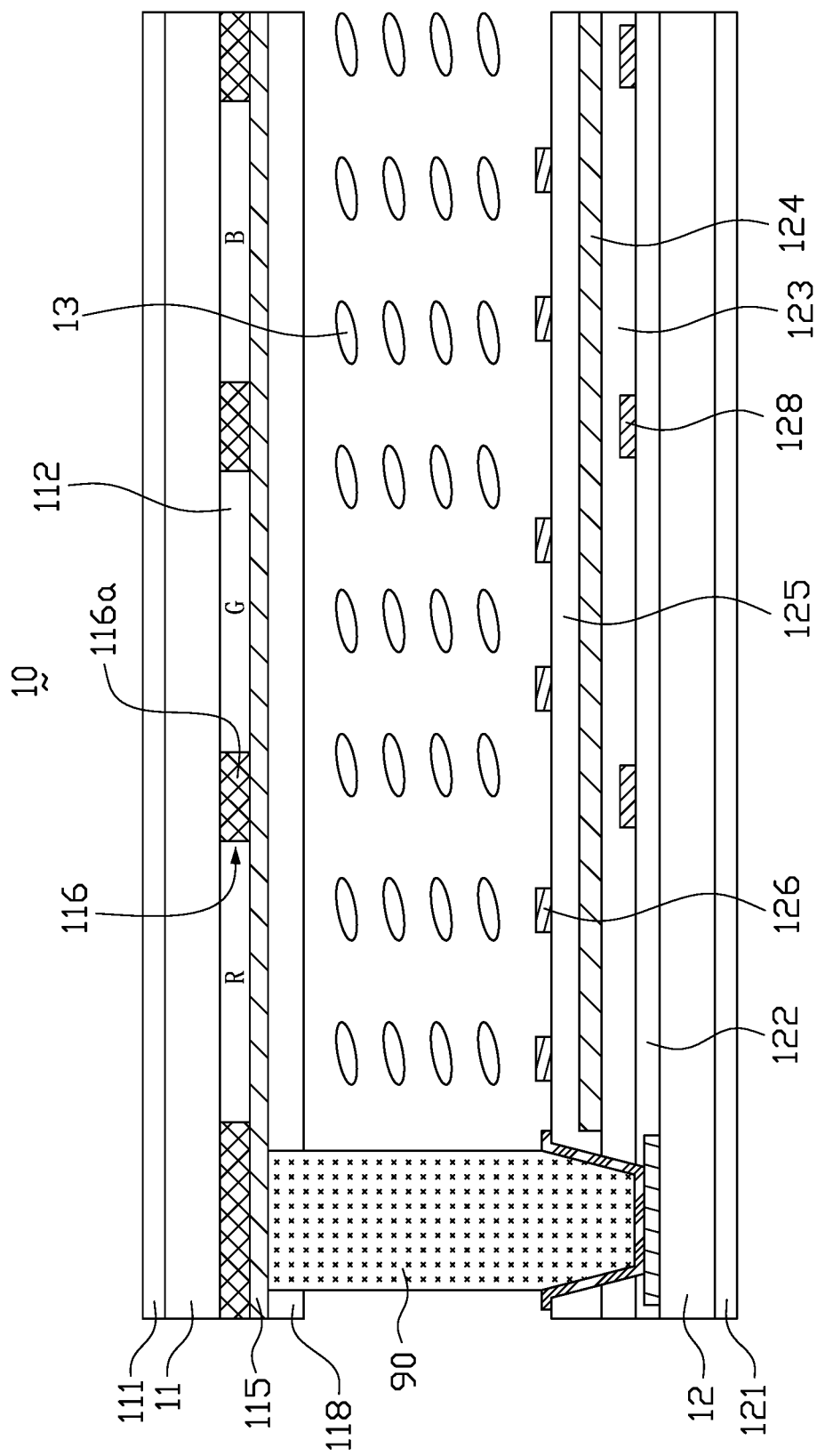

Alternatively, as shown in FIG. 11, the first substrate 11 is provided with a color filter layer 112, a fourth electrode 116, a third electrode 115 and an overcoat layer 118 on the surface facing towards the liquid crystal layer 13. FIG. 11 differs from FIG. 1 in that the strip-shaped metal conductive strips 116a of the fourth electrode 116 are intersected with each other to form a mesh structure and serve as the black matrix (BM), thereby omitting the original black matrix (BM) 113. Also, the overcoat layer between the color filter layer 112 and the third electrode 115 is omitted, and the color filter layer 112 and the fourth electrode 116 are covered by the third electrode 115.

In this embodiment, the fourth electrode 116 made of metal is provided on the first substrate 11. Since the metal conductive strips 116a of the fourth electrode 116 are distributed throughout the display panel 10 and electrically connected to the third electrode 115, the metal conductive strips 116a having small resistance and good conduction capability may serve as an auxiliary conductive connection for the third electrode 115. By electrically connecting the metal conductive strips 116a and the third electrode 115, the resistance of the third electrode 115 is lowered and the conductivity of the third electrode 115 is improved. As compared with a single third electrode 115, the signal delay during transmission of voltage signal is reduced due to having good conduction capability, and the voltage waveform is ensured without distortion during transmission, such that the display quality is avoided to be abnormal due to waveform distortion or signal attenuation.

Second Embodiment

Figure 12:
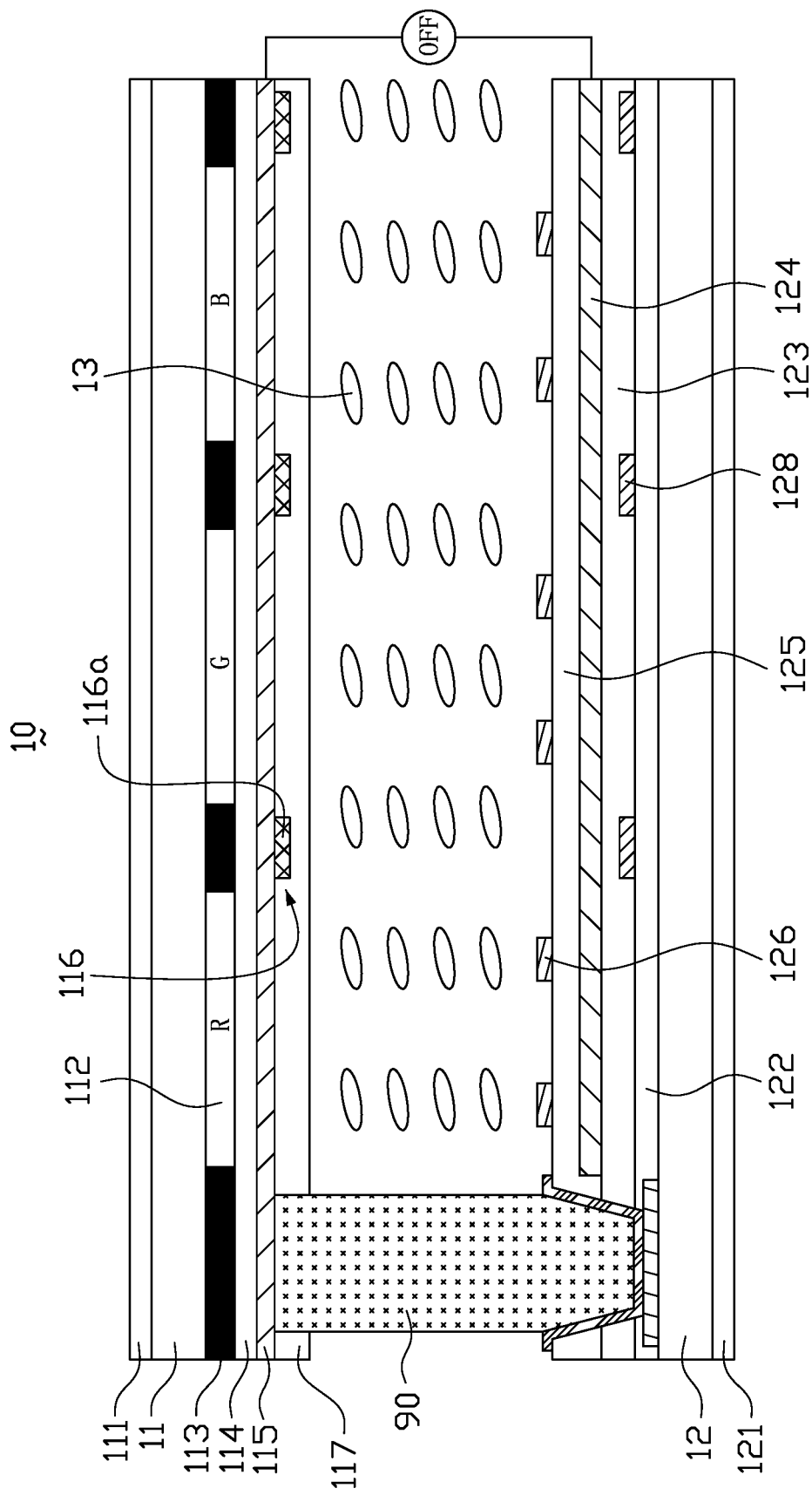
FIG. 12 is a schematic view of a liquid crystal display device in a narrow viewing angle mode according to a second embodiment of the present application.
Figure 13:
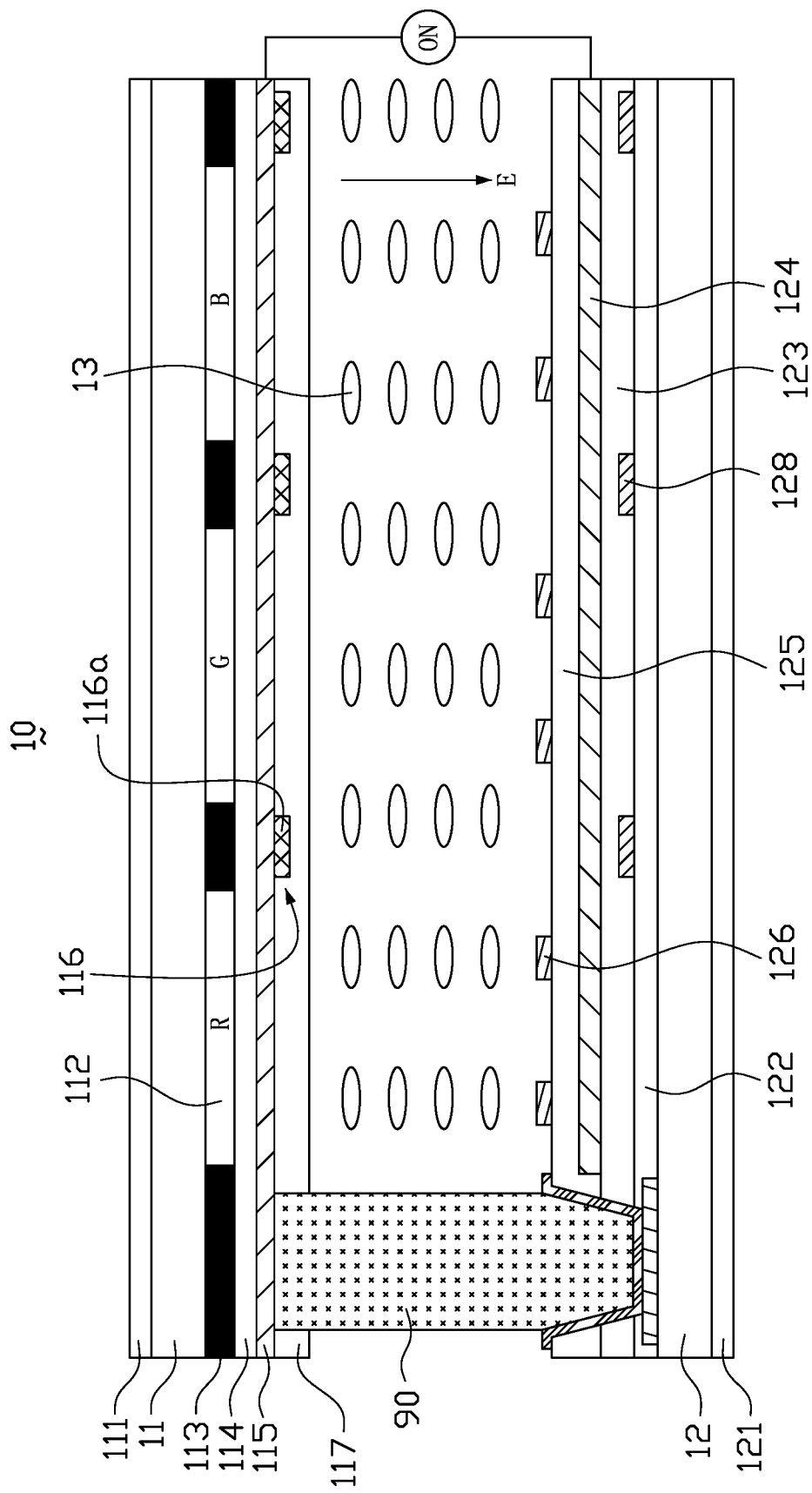
FIG. 13 is a schematic view of the liquid crystal display device of FIG. 12 in a wide viewing angle mode.

FIG. 12 is a schematic view of a liquid crystal display device in a narrow viewing angle mode according to a second embodiment of the present application, and FIG. 13 is a schematic view of the liquid crystal display device of FIG. 12 in a wide viewing angle mode. Referring to FIG. 12 and FIG. 13, the main difference between this embodiment and the above first embodiment is in that the liquid crystal layer 13 in this embodiment employs negative liquid crystal molecules. With the advancement of technology, the performance of negative liquid crystal is significantly improved, and its application is more and more extensive. As shown in FIG. 12, in the initial state (i.e., no voltage is applied to the display panel 10), the negative liquid crystal molecules in the liquid crystal layer 13 have an initial pretilt angle with respect to the substrates 11, 12, that is, the negative liquid crystal molecules assume a tilting posture with respect to the substrates 11, 12. Under the action of an electric field generated by a voltage, the long axis of the negative liquid crystal molecules will deflect towards a direction perpendicular to the direction of the electric field lines.

Referring to FIG. 12, a direct current common voltage (i.e., DC Vcom) is applied to the first electrode 124, and a direct current voltage is also applied to the third electrode 115, such that the potential difference between the direct current voltage applied to the third electrode 115 and the direct current common voltage applied to the first electrode 124 is small (e.g., smaller than 1V). Since a bias voltage between the third electrode 115 and the first electrode 124 is small, the tilt angle of the liquid crystal molecules is almost unchanged and remains in the tilting posture. Since the pretilt angle of the liquid crystal molecules in the liquid crystal layer 13 is large, the light passing through the liquid crystal molecules in the squint direction of the display panel 10 is not matched with the upper and lower polarizers 111 and 121 due to phase delay, and a light leakage occurs. When the display panel 10 is viewed from the squint direction, the contrast of the screen is lowered to affect the viewing effect, and the viewing angle is reduced, thereby achieving a narrow viewing angle mode.

Referring to FIG. 13, a direct current common voltage (i.e., DC Vcom) is applied to the first electrode 124, and a periodic alternating voltage is applied to the third electrode 115. The periodic alternating voltage applied to the third electrode 115 fluctuates around the direct current common voltage applied to the first electrode 124, so that the potential difference between the periodic alternating voltage applied to the third electrode 115 and the direct current common voltage applied to the first electrode 124 is large (e.g., greater than 1V). Since a large bias voltage exists between the third electrode 115 of the first substrate 11 and the first electrode 124 of the second substrate 12, a strong vertical electric field is generated between the two substrates 11, 12 (as indicated by the arrow E in FIG. 13). Since the negative liquid crystal molecules will deflect towards a direction perpendicular to the electric field lines under an electric field, the negative liquid crystal molecules are deflected under the action of the vertical electric field, to reduce the tilt angle between the liquid crystal molecules and the substrates 11, 12. When the tilt angle of the liquid crystal molecules is reduced to a lying posture substantially parallel to the substrates 11 and 12, the light leakage phenomenon is reduced in the squint direction of the display panel 10, and the viewing angle of the display panel 10 is increased accordingly, to achieve a wide viewing angle mode. That is, in this embodiment, when the above-described periodic alternating voltage is applied to the third electrode 115 of the first substrate 11, the liquid crystal display device switches from a narrow viewing angle mode to a wide viewing angle mode.

For other structures of this embodiment, reference may be made to the above first embodiment, and details are omitted herein for clarity.

Third Embodiment

The present application also provides a viewing angle switching method for a liquid crystal display device, for performing viewing angle switching control on the above-described viewing angle switchable liquid crystal display device, and the viewing angle switching method includes:

detecting whether the user issues a viewing angle switching request for switching the viewing angle;

when receiving a viewing angle switching request, supplying a periodic alternating voltage to the third electrode 115 of the first substrate 11, wherein the period T2 of the periodic alternating voltage is an even multiple of the refresh period T1 of each frame of the display panel 10.

Preferably, the period T2 of the periodic alternating voltage is twice or four times the refresh period T1 of each frame of the display panel 10. The waveform of the periodic alternating voltage may be a square wave, a trapezoidal square wave, a sine wave, a triangular wave, a saw-tooth wave or other waveforms.

Preferably, the periodic alternating voltage fluctuates around the direct current common voltage (i.e., DC Vcom) applied to the first electrode 124, and the potential difference between the periodic alternating voltage and the direct current common voltage is greater than 1V.

The liquid crystal molecules in the liquid crystal layer 13 of the display panel 10 may be positive liquid crystal molecules. When the periodic alternating voltage described above is applied to the third electrode 115, the liquid crystal display device switches from a wide viewing angle mode to a narrow viewing angle mode.

The liquid crystal molecules in the liquid crystal layer 13 of the display panel 10 may also be negative liquid crystal molecules. When the periodic alternating voltage is applied to the third electrode 115, the liquid crystal display device switches from a narrow viewing angle mode to a wide viewing angle mode.

Figure 14A:
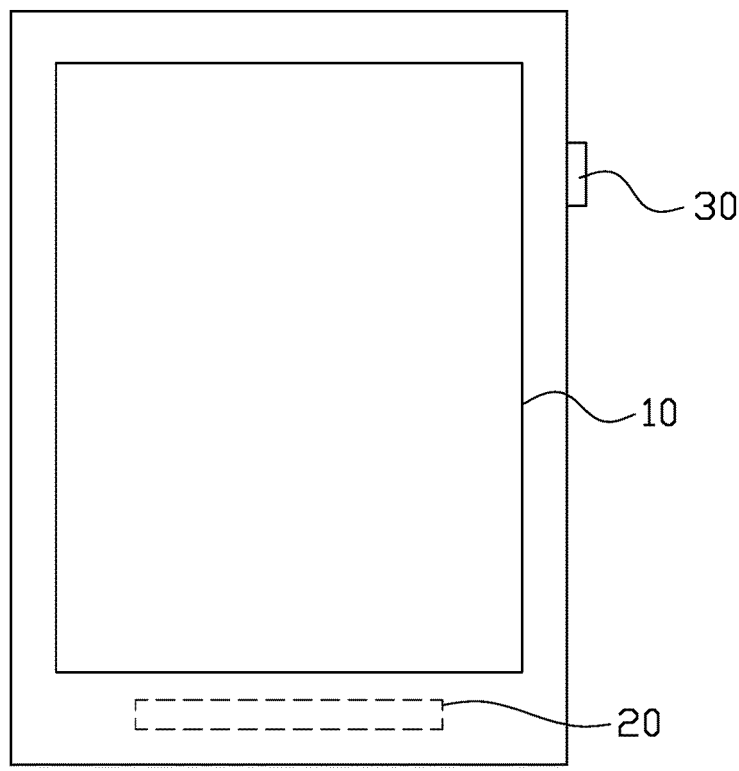
FIG. 14a to FIG. 14b are planar views of a liquid crystal display device according to a third embodiment of the present application.
Figure 14B:
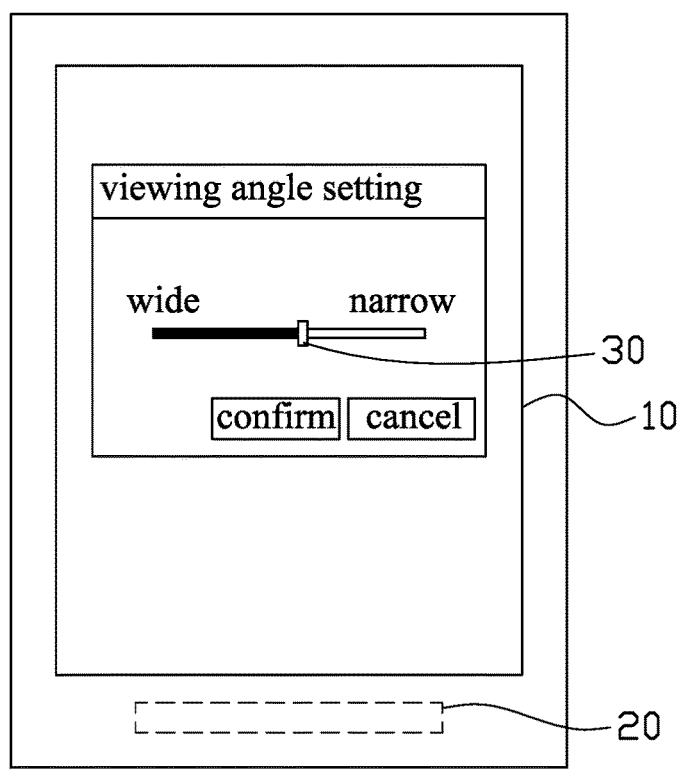

As shown in FIG. 14a and FIG. 14b, the liquid crystal display device is further provided with a viewing angle control button 30 for the user to issue the viewing angle switching request to the liquid crystal display device. The liquid crystal display device further includes a driving circuit 20. The driving circuit 20 is used for applying a voltage signal to the third electrode 115.

The viewing angle control button 30 can be a physical button (see FIG. 14a), and the viewing angle control button 30 can be protruded from the outer casing of the liquid crystal display device, so that the user can issue a viewing angle switching request to the liquid crystal display device by pressing it. The viewing angle control button 30 can also be a software control or an application (APP) to implement the switching function (see FIG. 14b, the viewing angles are set by touching a slider bar).

Taking the liquid crystal display device shown in FIG. 1 and FIG. 2 as an example, under normal circumstances, the liquid crystal display device is in a wide viewing angle mode. When it is needed to switch to a narrow viewing angle mode for protection of privacy, the user can operate the viewing angle control button 30 to issue a viewing angle switching request. Upon receiving the viewing angle switching request, the driving circuit 20 starts to apply a periodic alternating voltage having a relatively large amplitude to the third electrode 115, such that a potential difference is generated between the third electrode 115 of the first substrate 11 and the first electrode 124 of the second substrate 12, to generate a strong vertical electric field E between the first substrate 11 and the second substrate 12. The liquid crystal molecules are deflected by the vertical electric field E, thereby switching to the narrow viewing angle mode. When the narrow viewing angle mode is not required, the user can operate the viewing angle control button 30 again to cause the driving circuit 20 to remove the alternating voltage applied to the third electrode 115, thereby returning back to the wide viewing angle mode.

Therefore, by providing the viewing angle control button 30 for switching the viewing angle, the liquid crystal display device has good operational flexibility and convenience.

Fourth Embodiment

Figure 15:
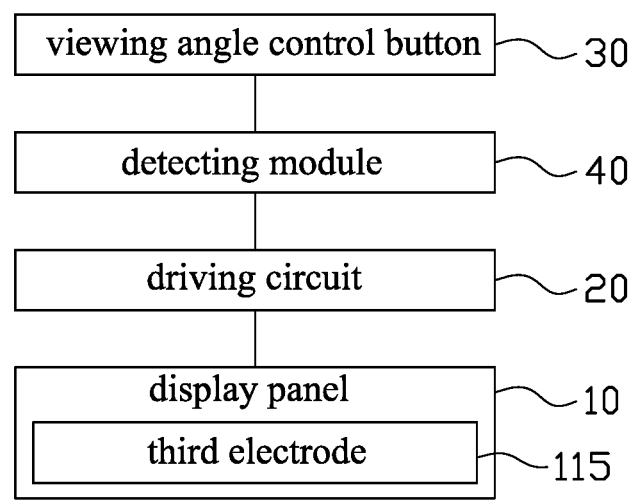
FIG. 15 is a block diagram of a liquid crystal display device according to a fourth embodiment of the present application.

As shown in FIG. 15, the present application further provides a liquid crystal display device with a switchable viewing angle, which includes:

a display panel 10 (referring to the above first embodiment), including a first substrate 11, a second substrate 12 disposed opposite the first substrate 11, and a liquid crystal layer 13 disposed between the first substrate 11 and the second substrate 12, the second substrate 12 being provided with a first electrode 124 and a second electrode 126, the first electrode 124 being a common electrode, the second electrode 126 being a pixel electrode, the first substrate 11 being provided with a third electrode 115 for controlling the switching of the viewing angle;

a detecting module 40 being configured to detect whether the user issues a viewing angle switching request for switching the viewing angle;

a driving circuit 20 being connected to the detecting module 40, when receiving a viewing angle switching request, the driving circuit 20 supplies a periodic alternating voltage to the third electrode 115 of the first substrate 11, and the period T2 of the periodic alternating voltage is an even multiple of the refresh period T1 of each frame of the display panel 10.

Preferably, the period T2 of the periodic alternating voltage is twice or four times the refresh period T1 of each frame of the display panel 10. The waveform of the periodic alternating voltage may be a square wave, a trapezoidal square wave, a sine wave, a triangular wave, a saw-tooth wave or other waveforms.

Preferably, the periodic alternating voltage fluctuates around the direct current common voltage (i.e., DC Vcom) applied to the first electrode 124, and the potential difference between the periodic alternating voltage and the direct current common voltage is greater than 1V.

The liquid crystal molecules in the liquid crystal layer 13 of the display panel 10 may be positive liquid crystal molecules. When the periodic alternating voltage described above is applied to the third electrode 115, the liquid crystal display device switches from a wide viewing angle mode to a narrow viewing angle mode.

The liquid crystal molecules in the liquid crystal layer 13 of the display panel 10 may also be negative liquid crystal molecules. When the periodic alternating voltage is applied to the third electrode 115, the liquid crystal display device switches from a narrow viewing angle mode to a wide viewing angle mode.

Further, the liquid crystal display device is provided with a viewing angle control button 30 for the user to issue a viewing angle switching request to the liquid crystal display device, and the detecting module 40 is connected to the viewing angle control button 30. When the user issues a viewing angle switching request to the liquid crystal display device through the viewing angle control button 30, the detecting module 40 can detect the viewing angle switching request issued by the user, and transmits the request to the driving circuit 20, so that the driving circuit 20 supplies the above-described periodic alternating voltage to the third electrode 115.

In summary, in the viewing angle switchable liquid crystal display device and the viewing angle switching method provided by the above embodiments of the present application, by providing a third electrode for controlling the viewing angle on the first substrate, a periodic alternating voltage is applied to the third electrode when switching the viewing angle, such that a vertical electric field is formed between the first substrate and the second substrate for driving the liquid crystal molecules to deflect, to easily achieve switching between the wide and narrow viewing angles for the display panel. Furthermore, the period of the periodic alternating voltage applied to the third electrode is an even multiple of the refresh period of each frame of the display panel, so that the positive and negative polarities are not switched in the middle of each frame during the display, thereby avoiding the problem of split-screen mura occurred due to the sudden change of voltage during the display of each frame, to improve the uniformity of the image display. The present application can easily realize switching between wide viewing angle and narrow viewing angle without using a shielding film, substantially without increasing product thickness and manufacturing cost, and having good operational flexibility and convenience, thereby providing a liquid crystal display device with the advantages of entertainment use and privacy protection.

The above are only the preferred embodiments of the present application, and are not intended to limit the present application. Any modifications, equivalents, improvements, etc., which are within the spirit and scope of the present application, should be included in the scope of the present application.

INDUSTRIAL APPLICABILITY

In embodiments of the present application, by providing a third electrode for controlling the viewing angle on the first substrate, a periodic alternating voltage is applied to the third electrode when switching the viewing angle, such that a vertical electric field is formed between the first substrate and the second substrate for driving the liquid crystal molecules to deflect, to easily achieve switching between the wide and narrow viewing angles for the display panel. Furthermore, the period of the periodic alternating voltage applied to the third electrode is an even multiple of the refresh period of each frame of the display panel, so that the positive and negative polarities are not switched in the middle of each frame during the display, thereby avoiding the problem of split-screen mura occurred due to the sudden change of voltage during the display of each frame, to improve the uniformity of the image display. The present application can easily realize switching between wide viewing angle and narrow viewing angle without using a shielding film, substantially without increasing product thickness and manufacturing cost, and having good operational flexibility and convenience, thereby providing a liquid crystal display device with the advantages of entertainment use and privacy protection.

What is claimed is:

1. A viewing angle switchable liquid crystal display device, comprising a display panel, the display panel comprising a first substrate, a second substrate disposed opposite the first substrate, and a liquid crystal layer disposed between the first substrate and the second substrate, wherein the second substrate is provided with a first electrode and a second electrode, the first electrode is a common electrode, the second electrode is a pixel electrode, the first substrate is provided with a third electrode for controlling the switching of the viewing angle, a periodic alternating voltage is applied to the third electrode when the viewing angle of the liquid crystal display device is switched, and a period of the periodic alternating voltage is an even multiple of a refresh period of each frame of the display panel;
wherein a fourth electrode is further provided on the first substrate, the fourth electrode comprises a plurality of metal conductive strips, and the metal conductive strips are electrically connected to the third electrode.

2. The viewing angle switchable liquid crystal display device of claim 1, wherein the liquid crystal molecules in the liquid crystal layer are positive liquid crystal molecules, when the periodic alternating voltage is applied to the third electrode, the liquid crystal display device switches from a wide viewing angle mode to a narrow viewing angle mode.

3. The viewing angle switchable liquid crystal display device of claim 2, wherein in the wide viewing angle mode, a direct current common voltage is applied to the first electrode, a direct current voltage is applied to the third electrode, and the potential difference between the direct current voltage applied to the third electrode and the direct current common voltage applied to the first electrode is smaller than 1V.

4. The viewing angle switchable liquid crystal display device of claim 2, wherein in the narrow viewing angle mode, a direct current common voltage is applied to the first electrode, a periodic alternating voltage is applied to the third electrode, the periodic alternating voltage applied to the third electrode fluctuates around the direct current common voltage applied to the first electrode, and the potential difference between the periodic alternating current applied to the third electrode and the direct current common voltage applied to the first electrode is greater than 1V.

5. The viewing angle switchable liquid crystal display device of claim 1, wherein the liquid crystal molecules in the liquid crystal layer are negative liquid crystal molecules, when the periodic alternating voltage is applied to the third electrode, the liquid crystal display device switches from a narrow viewing angle mode to a wide viewing angle mode.

6. The viewing angle switchable liquid crystal display device of claim 5, wherein in the narrow viewing angle mode, a direct current common voltage is applied to the first electrode, a direct current voltage is applied to the third electrode, and the potential difference between the direct current voltage applied to the third electrode and the direct current common voltage applied to the first electrode is smaller than 1V.

7. The viewing angle switchable liquid crystal display device of claim 5, wherein in the wide viewing angle mode, a direct current common voltage is applied to the first electrode, a periodic alternating voltage is applied to the third electrode, the periodic alternating voltage applied to the third electrode fluctuates around the direct current common voltage applied to the first electrode, and the potential difference between the periodic alternating current applied to the third electrode and the direct current common voltage applied to the first electrode is greater than 1V.

8. The viewing angle switchable liquid crystal display device of claim 1, wherein the period of the periodic alternating voltage is twice or four times the refresh period of each frame of the display panel.

9. The viewing angle switchable liquid crystal display device of claim 1, wherein a color filter layer and a black matrix are further provided on the first substrate, and the metal conductive strips are overlapped with the black matrix.

10. The viewing angle switchable liquid crystal display device of claim 1, wherein a color filter layer is further provided on the first substrate, and the metal conductive strips are intersected with each other to form a mesh structure and serve as a black matrix.

11. A viewing angle switching method of the liquid crystal display device of claim 1, comprising:
detecting whether the user issues a viewing angle switching request for switching the viewing angle;
when receiving a viewing angle switching request, supplying a periodic alternating voltage to the third electrode, wherein a period of the periodic alternating voltage is an even multiple of a refresh period of each frame of the display panel.

12. The viewing angle switching method of the liquid crystal display device of claim 11, wherein the liquid crystal display device is provided with a viewing angle control button for the user to issue the viewing angle switching request to the liquid crystal display device.

13. A viewing angle switchable liquid crystal display device, comprising:
- a display panel comprising a first substrate, a second substrate disposed opposite the first substrate, and a liquid crystal layer disposed between the first substrate and the second substrate, the second substrate being provided with a first electrode and a second electrode, the first electrode being a common electrode, the second electrode being a pixel electrode, the first substrate being provided with a third electrode for controlling the switching of the viewing angle;
- a detecting module being configured to detect whether the user issues a viewing angle switching request for switching the viewing angle;
- a driving circuit being connected to the detecting module, when receiving a viewing angle switching request, the driving circuit supplies a periodic alternating voltage to the third electrode, and a period of the periodic alternating voltage is an even multiple of a refresh period of each frame of the display panel.

14. The viewing angle switchable liquid crystal display device of claim 13, wherein the liquid crystal display device is provided with a viewing angle control button for the user to issue the viewing angle switching request to the liquid crystal display device, the detecting module is connected to the viewing angle control button.

* * * * *